(12) United States Patent
Bernat et al.

(10) Patent No.: US 10,824,358 B2
(45) Date of Patent: Nov. 3, 2020

(54) TECHNOLOGIES FOR DYNAMICALLY MANAGING THE RELIABILITY OF DISAGGREGATED RESOURCES IN A MANAGED NODE

(71) Applicant: Intel Corporation, Santa Clara, CA (US)

(72) Inventors: Francesc Guim Bernat, Barcelona (ES); Karthik Kumar, Chandler, AZ (US); Susanne M. Balle, Hudson, NH (US); Murugasamy K. Nachimuthu, Beaverton, OR (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 15/720,653

(22) Filed: Sep. 29, 2017

(65) Prior Publication Data
US 2018/0150343 A1    May 31, 2018

Related U.S. Application Data

(60) Provisional application No. 62/427,268, filed on Nov. 29, 2016.

(30) Foreign Application Priority Data

Aug. 30, 2017 (IN) .............................. 201741030632

(51) Int. Cl.
*G06F 11/00* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ..................................................... G06F 9/5005
See application file for complete search history.

(56) References Cited

U.S. PATENT DOCUMENTS

| 10,404,614 B2 * | 9/2019 | Chen ....................... H04L 67/10 |
| 2012/0137289 A1 * | 5/2012 | Nolterieke .......... G06F 9/45558 718/1 |

(Continued)

*Primary Examiner* — Jonathan D Gibson
(74) *Attorney, Agent, or Firm* — Barnes & Thornburg LLP

(57) ABSTRACT

Technologies for dynamically managing the reliability of disaggregated resources in a managed node include a resource manager server. The resource manager server includes communication circuit to receive resource data from a set of disaggregated resources that indicates reliability of each disaggregated resource of the set of disaggregated resources and a node request to compose a managed node. The resource manager server further includes a compute engine to determine node parameters from the node request indicative of a target reliability of one or more disaggregated resources of the set of disaggregated resources to be included in the managed node, compose a managed node from the set of disaggregated resources that satisfies the node parameters by configuring the compute sled to utilize the disaggregated resources of the managed node for the execution of a workload, and monitor the disaggregated resources of the managed node for a failure.

28 Claims, 19 Drawing Sheets

(51) Int. Cl.
| | |
|---|---|
| G06F 16/174 | (2019.01) |
| G06F 21/57 | (2013.01) |
| G06F 21/73 | (2013.01) |
| G06F 8/65 | (2018.01) |
| H04L 12/24 | (2006.01) |
| H04L 29/08 | (2006.01) |
| G06F 11/30 | (2006.01) |
| G06F 9/50 | (2006.01) |
| H03M 7/30 | (2006.01) |
| H03M 7/40 | (2006.01) |
| H04L 12/26 | (2006.01) |
| H04L 12/813 | (2013.01) |
| H04L 12/851 | (2013.01) |
| G06F 11/07 | (2006.01) |
| G06F 11/34 | (2006.01) |
| G06F 7/06 | (2006.01) |
| G06T 9/00 | (2006.01) |
| H03M 7/42 | (2006.01) |
| H04L 12/28 | (2006.01) |
| H04L 12/46 | (2006.01) |
| H04L 29/12 | (2006.01) |
| G06F 13/16 | (2006.01) |
| G06F 21/62 | (2013.01) |
| G06F 21/76 | (2013.01) |
| H03K 19/173 | (2006.01) |
| H04L 9/08 | (2006.01) |
| H04L 12/933 | (2013.01) |
| G06F 9/38 | (2018.01) |
| G06F 9/48 | (2006.01) |
| G06F 12/02 | (2006.01) |
| G06F 12/06 | (2006.01) |
| G06T 1/20 | (2006.01) |
| G06T 1/60 | (2006.01) |
| G06F 9/54 | (2006.01) |
| G06F 8/656 | (2018.01) |
| G06F 8/658 | (2018.01) |
| G06F 8/654 | (2018.01) |
| G06F 9/4401 | (2018.01) |
| H01R 13/453 | (2006.01) |
| H01R 13/631 | (2006.01) |
| H05K 7/14 | (2006.01) |
| H04L 12/911 | (2013.01) |
| G06F 11/14 | (2006.01) |
| H04L 29/06 | (2006.01) |
| G06F 15/80 | (2006.01) |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(56) References Cited

U.S. PATENT DOCUMENTS

| | | | |
|---|---|---|---|
| 2012/0240125 A1* | 9/2012 | Danko | G06F 9/50 718/104 |
| 2014/0282591 A1* | 9/2014 | Stich | G06F 9/5061 718/104 |
| 2015/0277536 A1* | 10/2015 | Vanka | G06F 1/3296 713/320 |
| 2017/0230376 A1* | 8/2017 | McEwen | G06Q 10/02 |
| 2018/0024964 A1* | 1/2018 | Mao | G06F 3/0655 711/173 |
| 2018/0113742 A1* | 4/2018 | Chung | G06F 9/5005 |
| 2018/0145923 A1* | 5/2018 | Chen | H04L 67/10 |
| 2018/0150343 A1* | 5/2018 | Bernat | G06F 3/067 |

* cited by examiner

TECHNOLOGIES FOR DYNAMICALLY MANAGING THE RELIABILITY OF DISAGGREGATED RESOURCES IN A MANAGED NODE

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

Applications executed in a data center use a set of resources in order to achieve a certain goal (e.g., process database queries). However, unexpected failures of resources (e.g., due to power failures or malfunctions in the hardware of the allocated resources) can greatly impact the ability of the application to execute successfully (e.g., within an expected time frame or at all). As a result, an administrator of a data center may choose to install homogenous devices (e.g., the same model of device from the same manufacturer) and schedule replacement of the devices based on an estimation of the usable lifetime of the devices from the manufacturer. However, doing so may cause inflexibility in the ability to add or remove resources in the data center as the resource requirements of applications change and/or as more customers utilize the data center. In data centers in which the types of devices that provide a given type of resource (e.g., memory or data storage) differ from each other, the reliability problem is exacerbated by the complexity in predicting when a particular device will fail, as each device may have different reliability characteristics.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
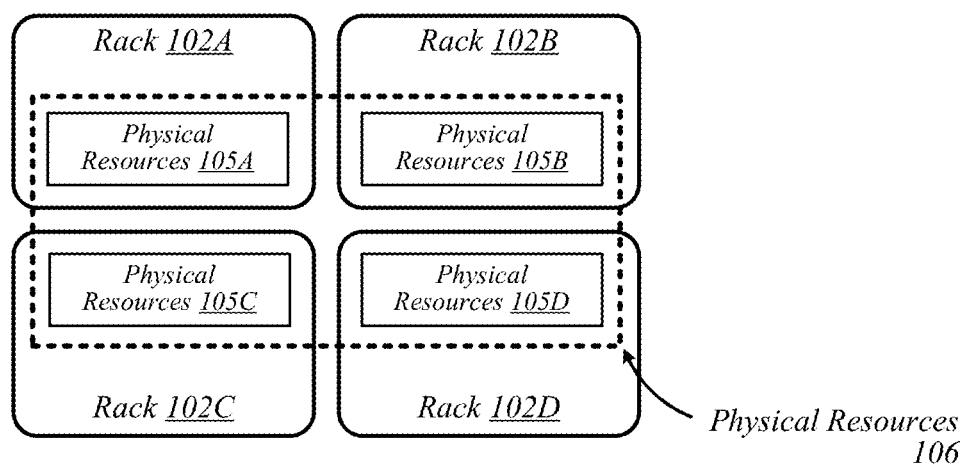
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
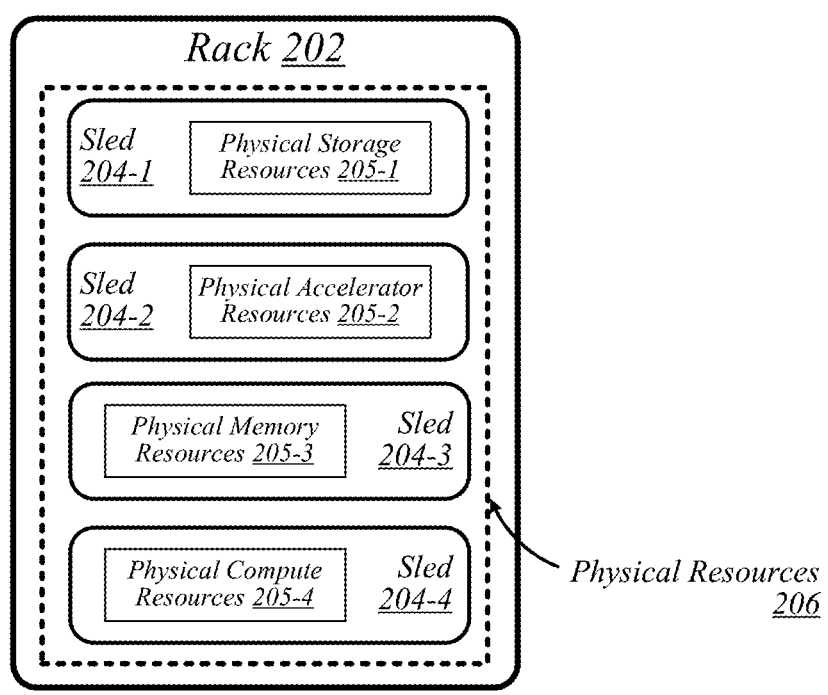
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
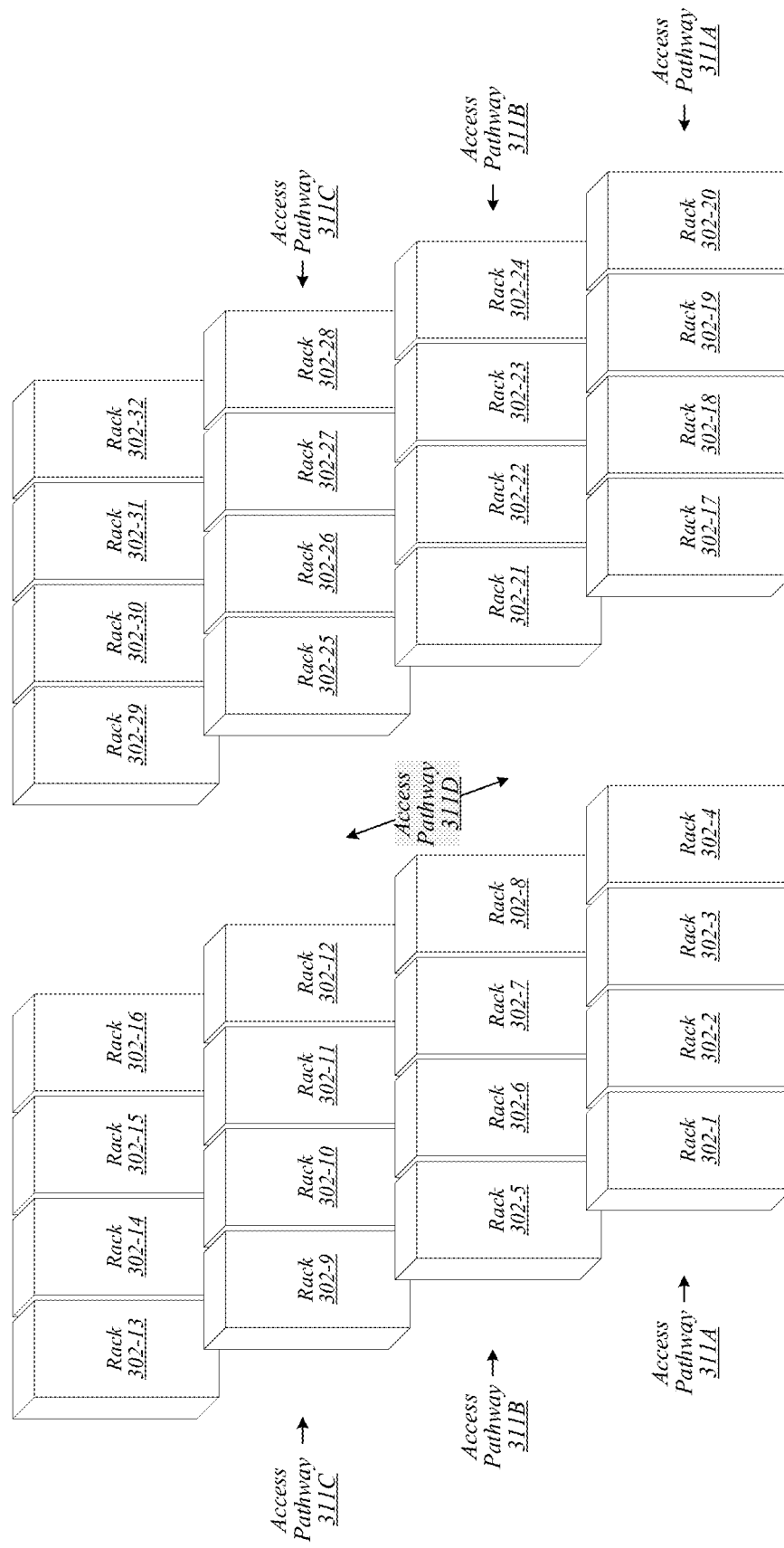
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
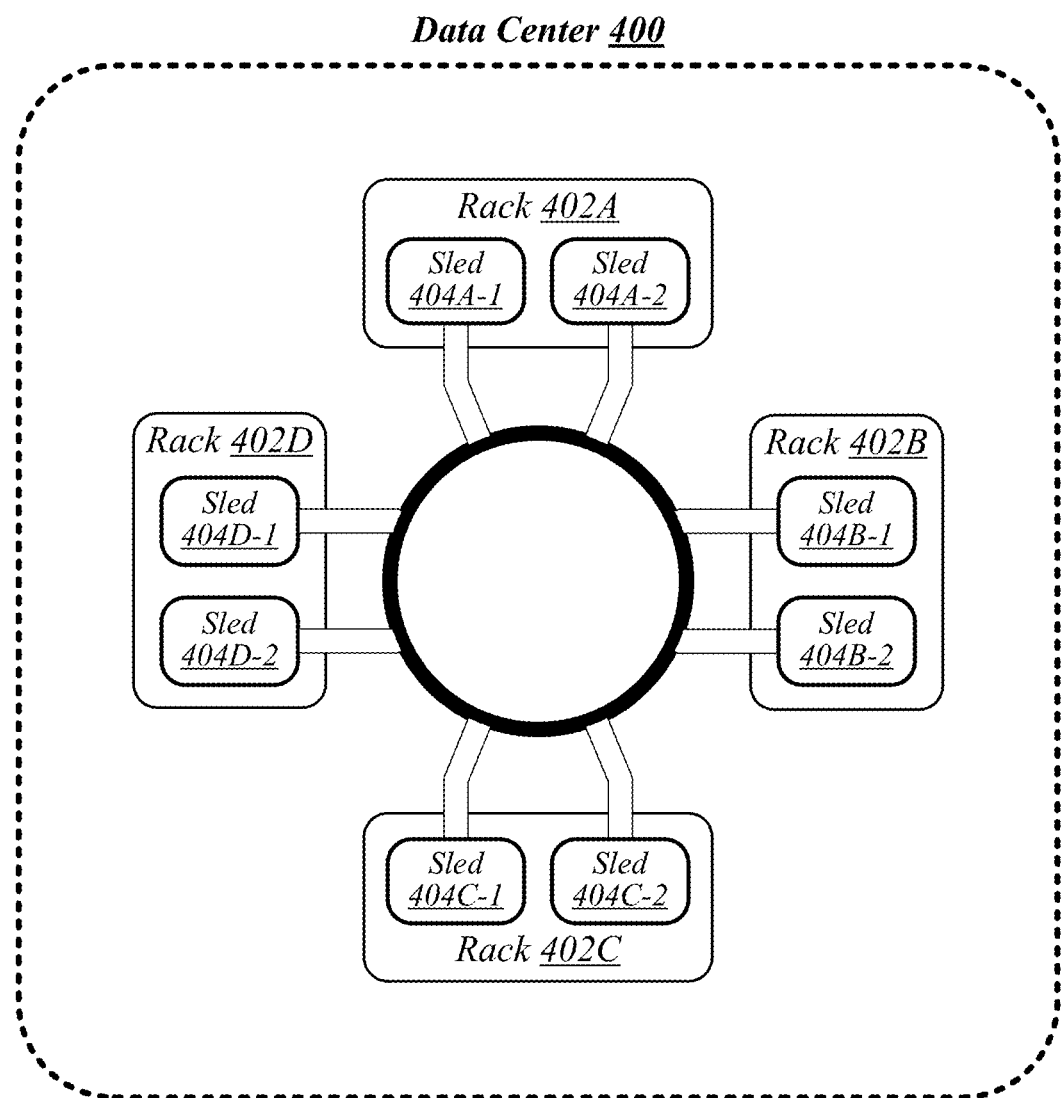
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
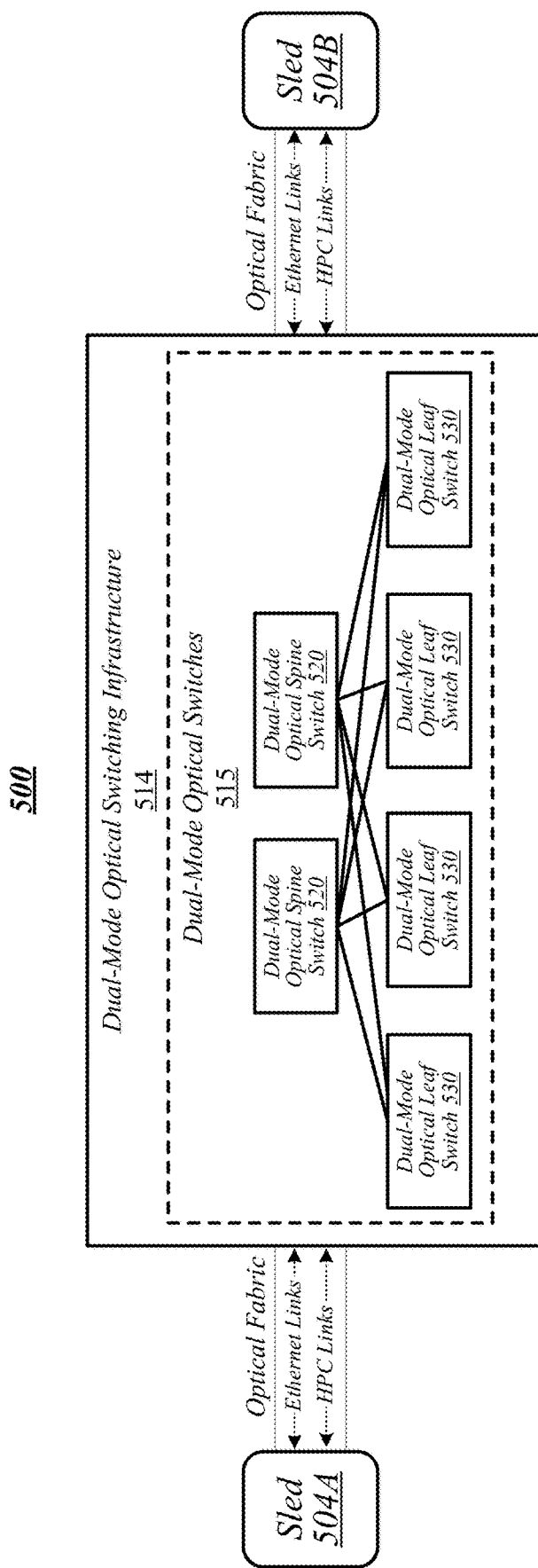
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
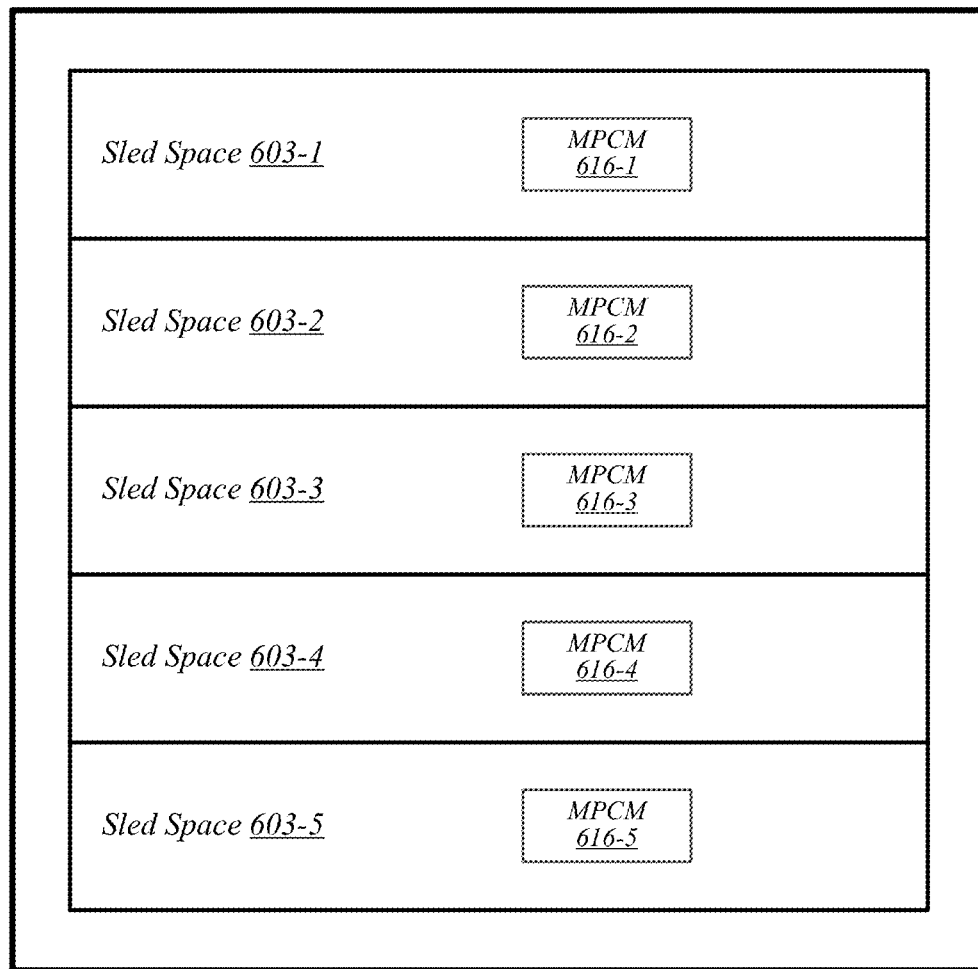
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
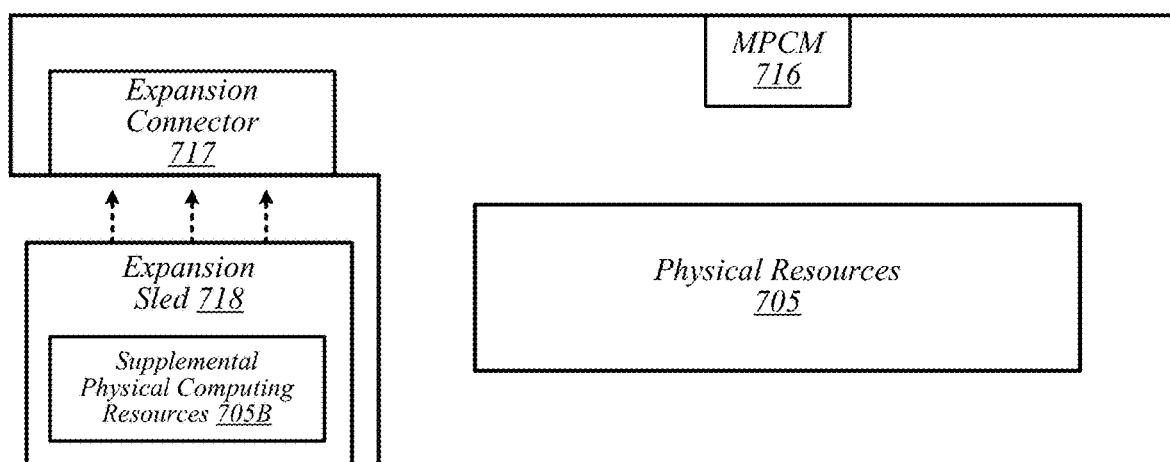
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
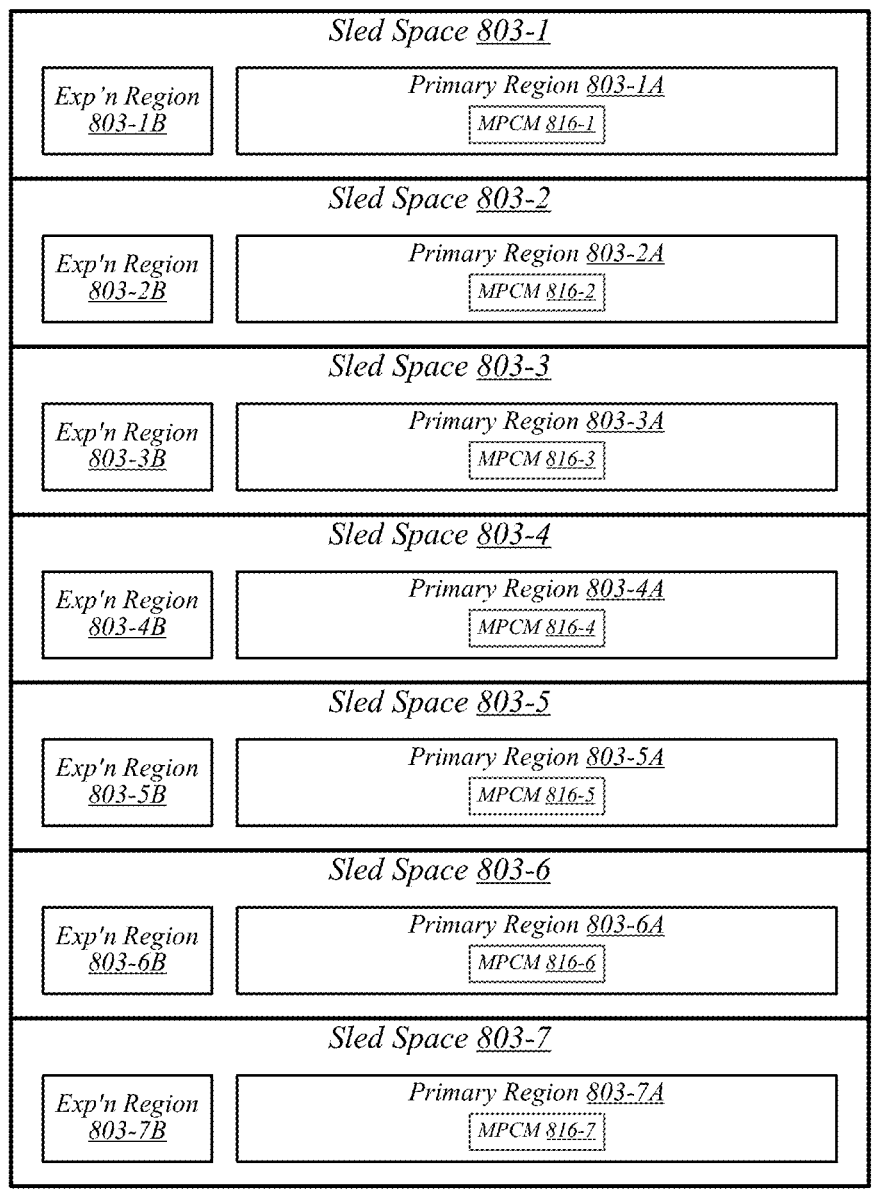
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
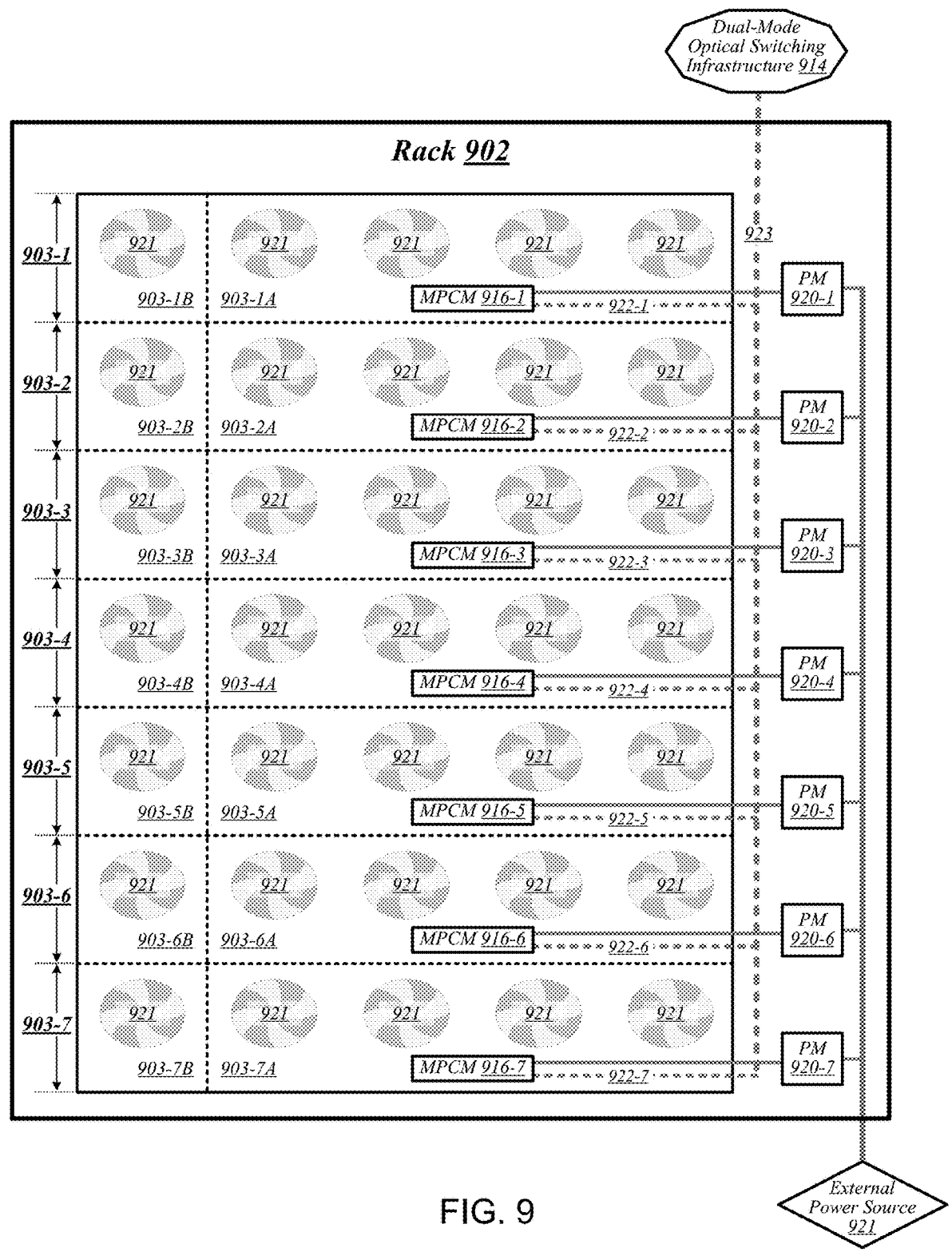
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
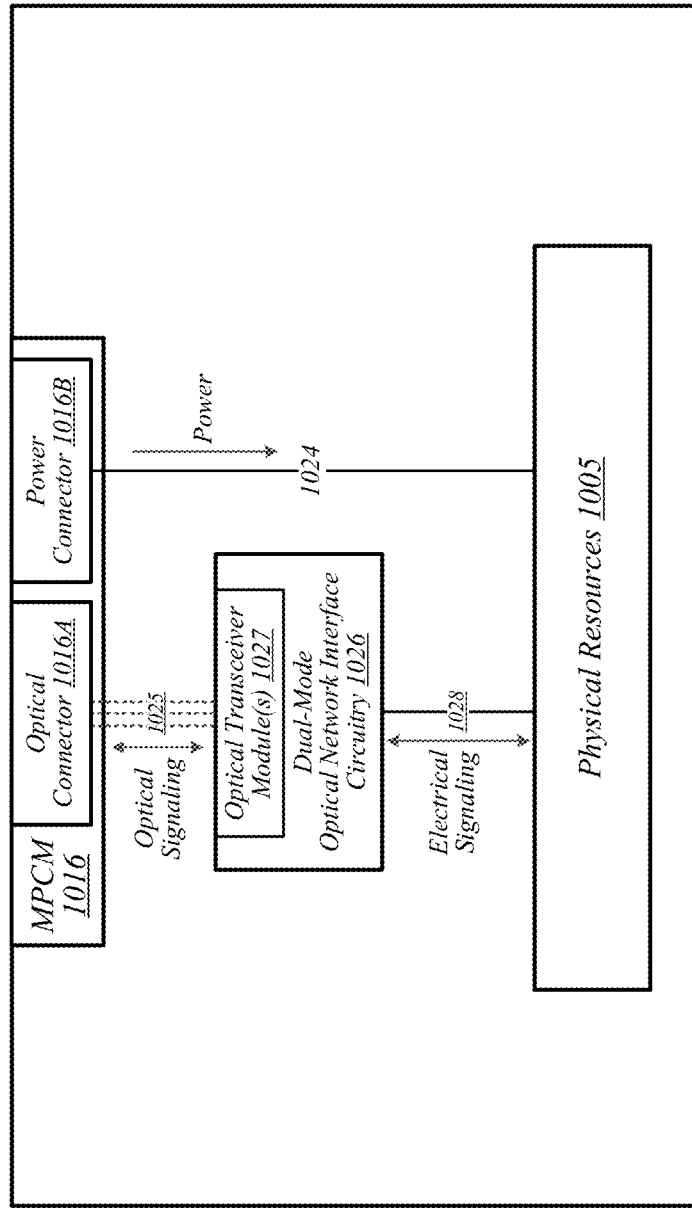
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
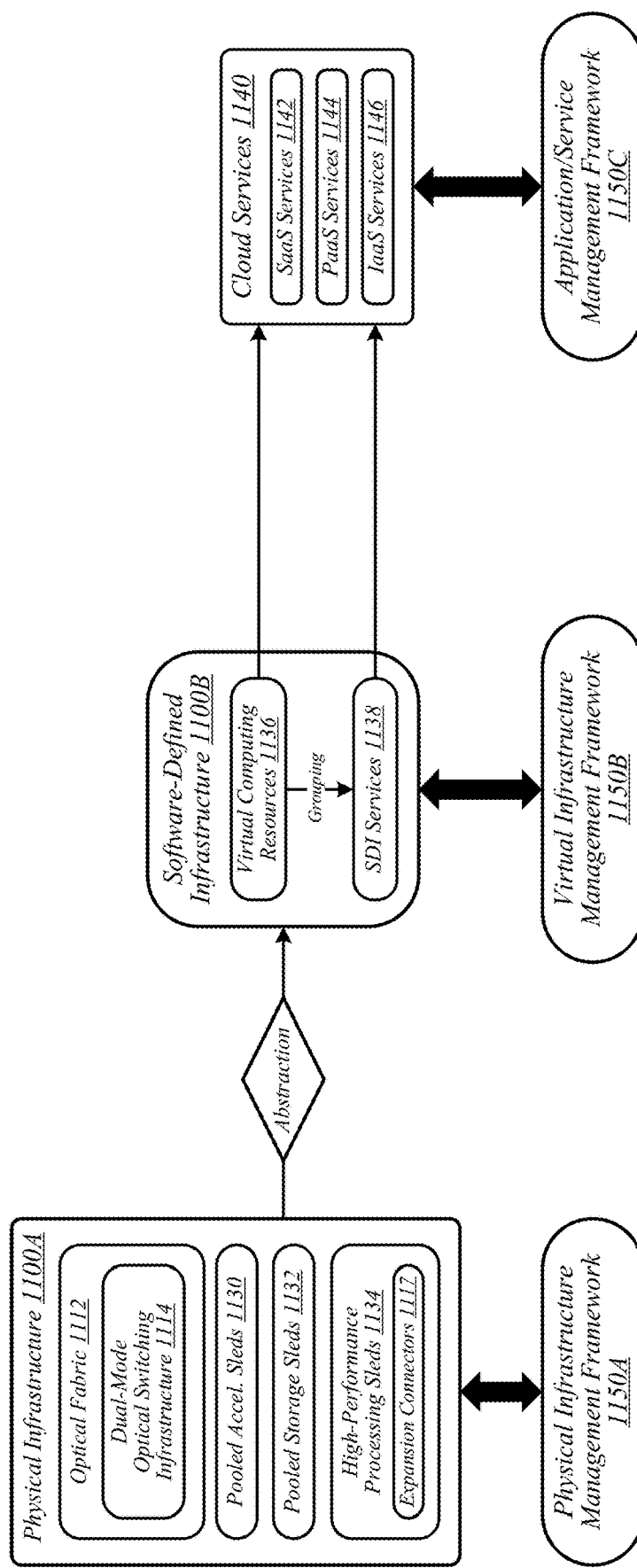
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
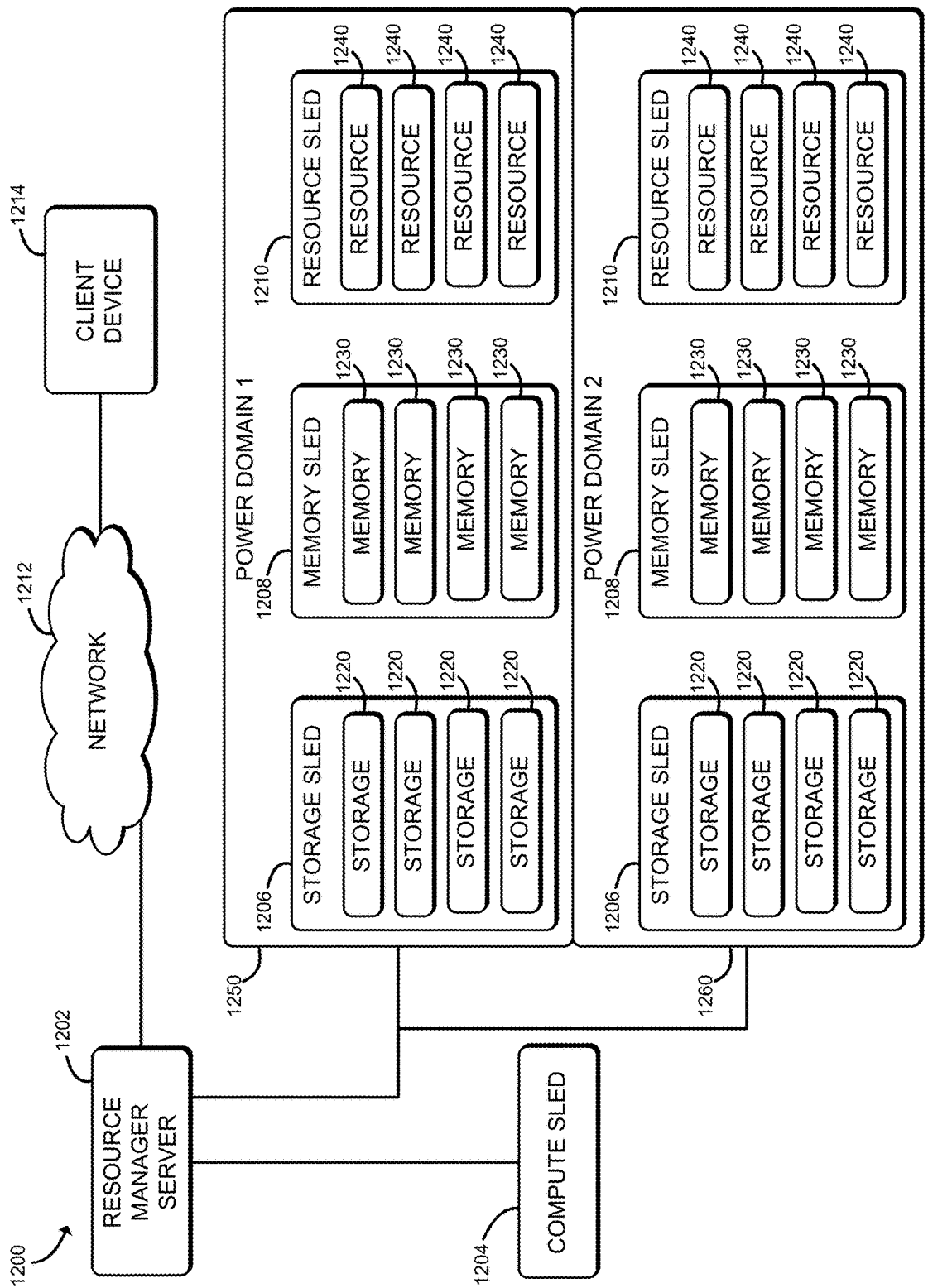
FIG. 12 is a simplified block diagram of at least one embodiment of a system for dynamically allocating disaggregated resources to a managed node as a function of the reliability of the disaggregated resources.

Referring now to FIG. 12, a system 1200 for dynamically allocating disaggregated resources to a managed node as a function of resource data (e.g., data indicative of reliability, availability, and resiliency of the disaggregated resources) may be implemented in accordance with the data centers 100, 300, 400, 1100 described above with reference to FIGS. 1, 3, 4, and 11. In the illustrative embodiment, the system 1200 includes a resource manager server 1202 in communication with an assembly of resources (e.g., physical resources 206) from the same or different sleds (e.g., the sleds 204-1, 204-2, 204-3, 204-4, etc.) or racks (e.g., one or more of racks 302-1 through 302-32). The assembly of resources (e.g., physical resources 206) include data storage resources 1220 (e.g., physical storage resources 205-1) of storage sleds 1206 (e.g., the sled 204-1), memory resources 1230 (e.g., physical memory resources 205-3) of memory sleds 1208 (e.g., the sled 204-3), or other resources 1240 (e.g., physical accelerator resources 205-2, physical compute resources 205-4) of other resource sleds 1210 (e.g., the sleds 204-2). As indicated, the resources may be physically grouped in power domains (i.e., resources powered by the same power and ground supply). It should be appreciated that, in some embodiments, the system 1200 may include a different number of power domains and each power domain may include a different number of compute sleds 1204, storage sleds 1206, memory sleds 1208, resource sleds 1210, and/or other sleds (e.g., accelerator sleds). Similarly, while each of the storage sleds 1206, the memory sleds 1208, and other resource sleds 1210 includes four storage resources 1220, four memory resources 1230, and four other resources 1240, respectively, it should be understood that in other embodiments, each sled 1206, 1208, 1210 may include a different number of resources. The system 1200 may be located in a data center and provide storage and compute services (e.g., cloud services) to a client device 1214 that is in communication with the system 1200 through a network 1212. The resource manager server 1202 may support a cloud operating environment, such as OpenStack, and the compute sled 1204, the storage sled 1206, the memory sled 1208, and the other resource sled 1210 may execute one or more applications or processes (i.e., workloads), such as in virtual machines or containers, on behalf of a user of the client device 1214.

In use, the resource manager server 1202 receives resource data (e.g., data indicative of reliability, availability, and resiliency of a disaggregated resource) from each of the disaggregated resources (e.g., the storage devices 1220, the memory devices 1230, and/or the other resources 1240, such as accelerator devices) that are communicatively coupled to the resource manager server 1202. The resource manager server 1202 may further receive a node request from the compute sled 1204 to compose a managed node that satisfies managed node parameters included in the request (e.g., pursuant to a service level agreement (SLA)). To do so, the resource manager server 1202 may select, based on the resource data associated with each of the disaggregated resources, a set of disaggregated resources to compose a managed node that satisfies the managed node parameters. For example, the managed node parameters may include a level of reliability, a level of availability, a level of resiliency, compute requirements, memory and storage requirements, and/or replication requirements. In some embodiments, the managed node parameters may include metadata that references predefined metrics (e.g., industry standards) indicative of a target level of reliability, availability, resiliency, etc. In the illustrative embodiment, the resource manager server 1202 may select the resources from different power domains and enable replication of application data on multiple resources to safeguard against a failure of one or more disaggregated resources of the managed node due to a hardware failure or a power outage of one of the power sources. Once the managed node is created, the compute sled 1204 may utilize the allocated resources in the execution of the application. For example, the resource manager server 1202 may create a managed node by selecting storage devices 1220, memory devices 1230, and other resources 1240 from different power domains 1250, 1260 to satisfy the managed node parameters.

Figure 13:
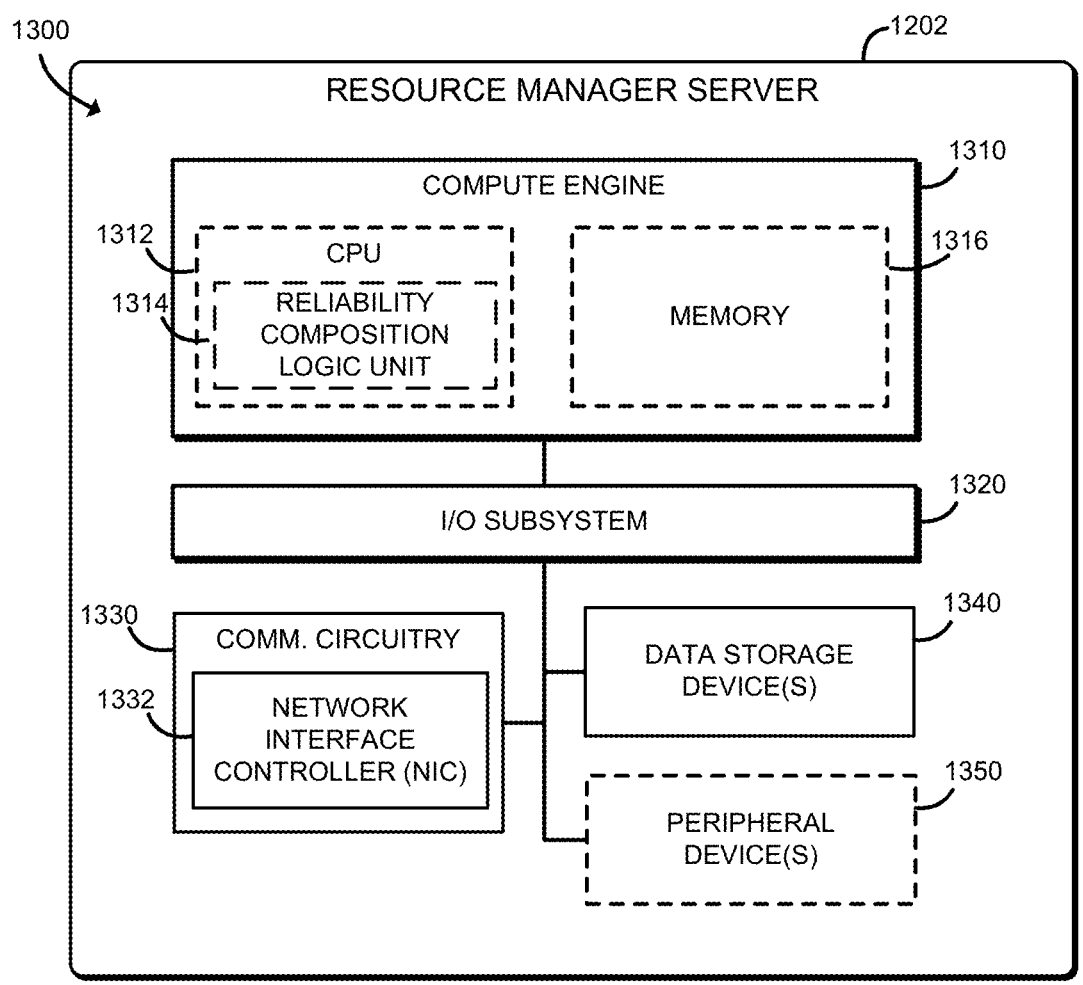
FIG. 13 is a simplified block diagram of at least one embodiment of a resource manager server of the system of FIG. 12.

Referring now to FIG. 13, the resource manager server 1202 may be embodied as any type of compute device capable of communicating between the compute sled 1204 and the disaggregated resources to compose a managed node for the execution of an application and performing the other functions described herein. The resource manager server 1202 may be configured to issue a request to have cloud services performed, receive results of the cloud services, continually receive resource data from the disaggregated resources, create a managed node pursuant to a node request from the compute sled 1204, and manage communications between components (e.g., the compute device, the storage devices 1220, the memory devices 1230, and/or other resources 1240) of the managed node. Moreover, as the application is being executed on the managed node, the resource manager server 1202 may monitor the resources of the managed node for a failure (e.g., a hardware failure and/or power outage), and, in response to a detection of a failure, recover from the failure by modifying the allocation of resources in the data center to managed node such that the modified managed node continues to satisfy the requested node parameters.

For example, the resource manager server 1202 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative resource manager server 1202 includes compute engine 1310, an input/output ("I/O") subsystem 1320, communication circuitry 1330, data storage device(s) 1340, and peripheral device(s) 1350. It should be appreciated that the resource manager server 1202 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 1310 may be embodied as any type of device or collection of devices capable of performing the various compute functions as described below. In some embodiments, the compute engine 1310 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1310 may include, or may be embodied as, a central processing unit (CPU) 1312 and memory 1316. The CPU 1312 may be embodied as any type of processor capable of performing the functions described herein. For example, the CPU 1312 may be embodied as a single or multi-core processor(s), digital signal processor, microcontroller, or other processor or processing/controlling circuit. In some embodiments, the CPU 1312 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1312 includes a reliability composition logic unit 1314, which may be embodied as any type of device or circuitry (e.g., a field programmable gate array (FPGA), an application specific integrated circuit (ASIC), reconfigurable hardware or hardware circuitry, or other specialized hardware) capable of receiving resource data from the disaggregated resources in the data center, receiving a node request that includes node parameters from a compute sled 1204, and selecting a set of disaggregated resources to compose a managed node that satisfies the node parameters to provide resources for the execution of an application. As discussed in detail below, the requested node parameters may include a level of reliability, a level of availability, a replication requirement, compute requirements, and/or memory and storage requirements. Additionally, the reliability composition logic unit 1314 may further transmit resource identifiers of the selected disaggregated resources of a managed node to the compute sled 1204. For example, the resource identifiers may include address data (e.g., IP addresses) of sleds (the storage sled(s) 1206, the memory sled(s) 1208, and other resource sled(s) 1210) included in the managed node and ranges of memory address within devices on the sleds of the managed node to be accessed (e.g., write to and/or read from) to execute an application. In some embodiments, the reliability composition logic unit 1314 may also transmit data to the compute sled 1204 instructing how to replicate data (e.g., send multiple writes of the same data to multiple memory devices 1230 on different memory sleds 1208 that have been allocated) to achieve the requested level of reliability.

The memory 1316 may be embodied as any type of volatile (e.g., dynamic random access memory (DRAM), etc.) or non-volatile memory or data storage capable of performing the functions described herein. In some embodiments, all or a portion of the memory 1316 may be integrated into the CPU 1312. In operation, the memory 1316 may store various software and data used during operation such as resource data, managed node parameter data, failure history data, operating systems, applications, programs, libraries, and drivers.

The I/O subsystem 1320 may be embodied as circuitry and/or components to facilitate input/output operations with the CPU 1312, the memory 1316, and other components of the resource manager server 1202. For example, the I/O subsystem 1320 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1320 may form a portion of a system-on-a-chip (SoC) and be incorporated, along with one or more of the CPU 1312, the memory 1316, and other components of the resource manager server 1202, on a single integrated circuit chip.

The communication circuitry 1330 may be embodied as any communication circuit, device, or collection thereof, capable of enabling communications between the resource manager server 1202 and another compute device (e.g., the client device 1214, the compute sled 1204, and/or the disaggregated resources). The communication circuitry 1330 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1330 includes a network interface controller (NIC) 1332, which may also be referred to as a host fabric interface (HFI). The NIC 1332 may be embodied as one or more add-in-boards, daughtercards, network interface cards, controller chips, chipsets, or other devices that may be used by the resource manager server 1202 to connect with another compute device (e.g., the client device 1214, the compute sled 1204, and/or the disaggregated resources). In some embodiments, the NIC 1332 may be embodied as part of a system-on-a-chip (SoC) that includes one or more processors, or included on a multichip package that also contains one or more processors. In some embodiments, the NIC 1332 may include a local processor (not shown) and/or a local memory (not shown) that are both local to the NIC 1332. In such embodiments, the local processor of the NIC 1332 may be capable of performing one or more of the functions of the CPU 1312 described herein. Additionally or alternatively, in such embodiments, the local memory of the NIC 1332 may be integrated into one or more components of the resource manager server 1202 at the board level, socket level, chip level, and/or other levels.

The one or more illustrative data storage devices 1340, may be embodied as any type of devices configured for short-term or long-term storage of data such as, for example, memory devices and circuits, memory cards, hard disk drives, solid-state drives, or other data storage devices. Each data storage device 1340 may include a system partition that stores data and firmware code for the data storage device 1340. Each data storage device 1340 may also include an operating system partition that stores data files and executables for an operating system.

Additionally or alternatively, the resource manager server 1202 may include one or more peripheral devices 1350. Such peripheral devices 1350 may include any type of peripheral device commonly found in a compute device such as a display, speakers, a mouse, a keyboard, and/or other input/output devices, interface devices, and/or other peripheral devices.

Figure 14:
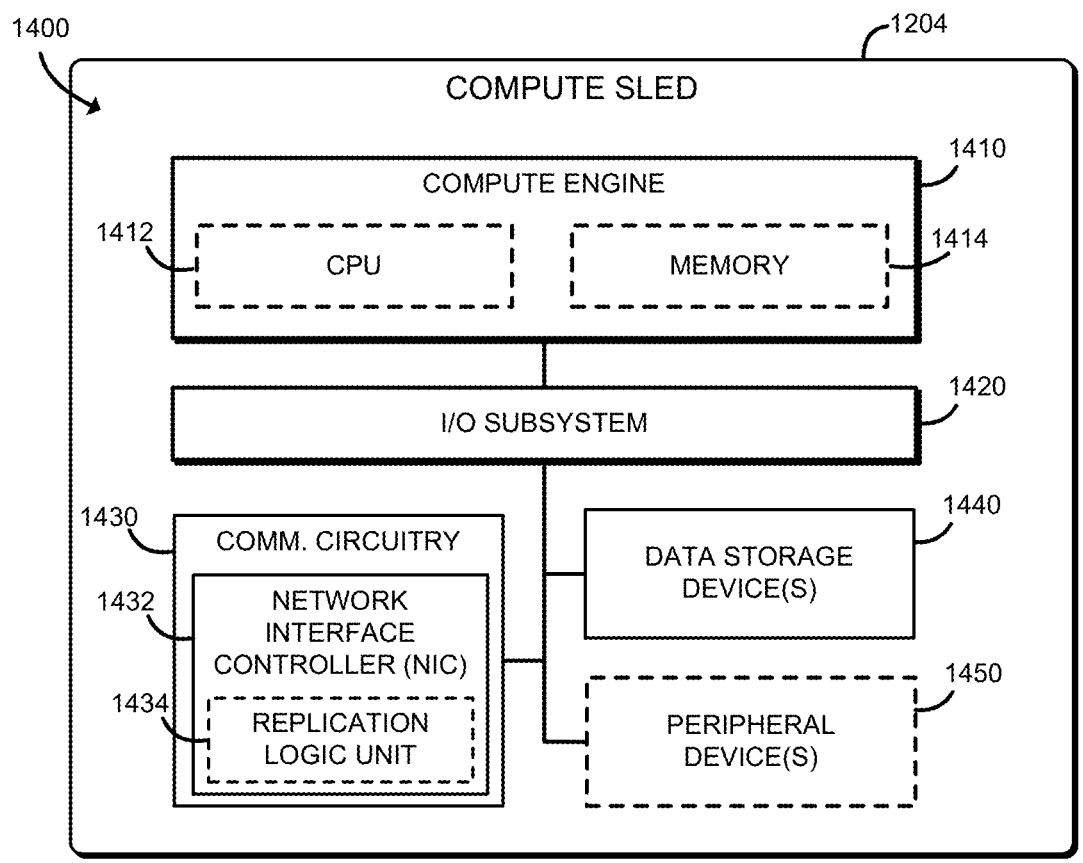
FIG. 14 is a simplified block diagram of at least one embodiment of a compute sled of the system of FIG. 12.

Referring now to FIG. 14, the compute sled 1204 may be embodied as any type of compute device capable of executing a workload (e.g., an application) and performing the other functions described herein, including requesting the resource manager server 1202 to create a managed node to execute an application. For example, the compute sled 1204 may be embodied as a compute sled 204-4, a computer, a distributed computing system, a multiprocessor system, a network appliance (e.g., physical or virtual), a desktop computer, a workstation, a laptop computer, a notebook computer, a processor-based system, or a network appliance.

As shown in FIG. 14, the illustrative compute sled 1204 includes compute engine 1410, an input/output ("I/O") subsystem 1420, communication circuitry 1430, data storage device(s) 1440, and peripheral device(s) 1450. It should be appreciated that the compute sled 1204 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 1410 may be embodied as any type of device or collection of devices capable of performing the various compute functions as described below. In some embodiments, the compute engine 1410 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1410 may include, or may be embodied as, a central processing unit (CPU) 1412 and memory 1414. The CPU 1412 may be embodied as any type of processor capable of performing the functions described herein. For example, the CPU 1412 may be embodied as a single or multi-core processor(s), digital signal processor, microcontroller, or other processor or processing/controlling circuit. In some embodiments, the CPU 1412 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the memory 1414 may be embodied as any type of volatile (e.g., dynamic random access memory (DRAM), etc.) or non-volatile memory or data storage capable of performing the functions described herein. In some embodiments, all or a portion of the memory 1414 may be integrated into the CPU 1412. In operation, the memory 1414 may store various software and data used during operation such as operating systems, applications, programs, libraries, and drivers.

The I/O subsystem 1420 may be embodied as circuitry and/or components to facilitate input/output operations with the CPU 1412, the memory 1414, and other components of the compute sled 1204. For example, the I/O subsystem 1420 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1420 may form a portion of a system-on-a-chip (SoC) and be incorporated, along with one or more of the CPU 1412, the memory 1414, and other components of the compute sled 1204, on a single integrated circuit chip.

The communication circuitry 1430 may be embodied as any communication circuit, device, or collection thereof, capable of enabling communications between the compute sled 1204 and the resource manager server 1202 and other compute devices (e.g., the disaggregated resources). The communication circuitry 1430 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1430 includes a network interface controller (NIC) 1432, which may also be referred to as a host fabric interface (HFI). The NIC 1432 may be embodied as one or more add-in-boards, daughtercards, network interface cards, controller chips, chipsets, or other devices that may be used by the compute sled 1204 to connect with another compute device (e.g., the client device 1214 and/or the disaggregated resources). In some embodiments, the NIC 1432 may be embodied as part of a system-on-a-chip (SoC) that includes one or more processors, or included on a multichip package that also contains one or more processors. In some embodiments, the NIC 1432 may include a local processor (not shown) and/or a local memory (not shown) that are both local to the NIC 1432. In such embodiments, the local processor of the NIC 1432 may be capable of performing one or more of the functions of the CPU 1412 described herein. Additionally or alternatively, in such embodiments, the local memory of the NIC 1432 may be integrated into one or more components of the compute sled 1204 at the board level, socket level, chip level, and/or other levels.

In addition, the NIC 1432 may further include a replication logic unit 1434. The replication logic unit 1434 may be embodied as any type of device or circuitry capable of replicating data and balancing data access operations across the storage sleds 1206, the memory sleds 1208, and/or other resource sleds 1210. For example, in some embodiments, the replication logic unit 1434 may replicate writes to address space of multiple disaggregated resources (e.g., the storage devices 1220, the memory devices 1230, and/or other resources 1240) of a managed node that are in different power domains. The replication logic unit 1434 may receive, from the resource manager server 1202, resource identifiers of selected disaggregated resources of a managed node and instructions on how to replicate data (e.g., send multiple writes of the same data to multiple memory devices 1230 on different memory sleds 1208 that have been allocated to the managed node) to achieve the requested level of reliability. In other embodiments, the replication logic unit 1434 may implement load balancing schemes to distribute data access requests (e.g., reads and/or writes) across the disaggregated resources of a managed node.

The one or more illustrative data storage devices 1440, may be embodied as any type of devices configured for short-term or long-term storage of data such as, for example, memory devices and circuits, memory cards, hard disk drives, solid-state drives, or other data storage devices. Each data storage device 1440 may include a system partition that stores data and firmware code for the data storage device 1440. Each data storage device 1440 may also include an operating system partition that stores data files and executables for an operating system.

Additionally or alternatively, the compute sled 1204 may include one or more peripheral devices 1450. Such peripheral devices 1450 may include any type of peripheral device commonly found in a compute device such as a display, speakers, a mouse, a keyboard, and/or other input/output devices, interface devices, and/or other peripheral devices.

Referring back to FIG. 12, the client device 1214 and the resource manager server 1202 and the sleds of the system 1200 (e.g., the compute sled 1204, the storage sleds 1206, the memory sleds 1208, and other resource sleds 1210) are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 15:
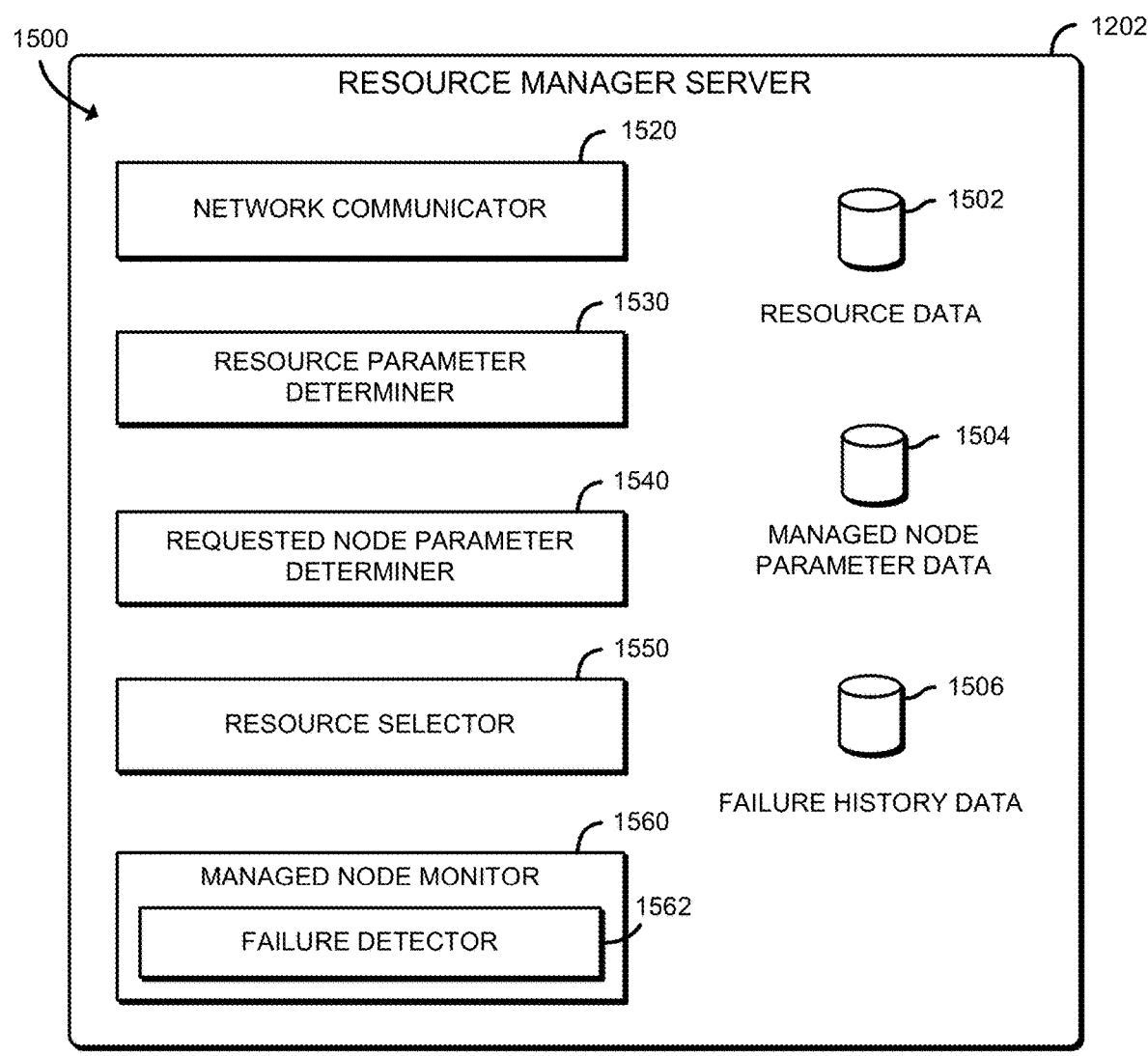
FIG. 15 is a simplified block diagram of at least one embodiment of an environment that may be established by the resource manager server of FIGS. 12 and 13.

Referring now to FIG. 15, in the illustrative embodiment, the resource manager server 1202 may establish an environment 1500 during operation. The illustrative environment 1500 includes a network communicator 1520, a resource parameter determiner 1530, a requested node parameter determiner 1540, a resource selector 1550, and a managed node monitor 1560, which includes a failure detector 1562. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, resource parameter determiner circuitry 1530, requested node parameter determiner circuitry 1540, resource selector circuitry 1550, managed node monitor circuitry 1560, failure detector circuitry 1562 etc.). It should be appreciated that, in such embodiments, one or more of the network communicator circuitry 1520, the resource parameter determiner circuitry 1530, the requested node parameter determiner circuitry 1540, the resource selector circuitry 1550, the managed node monitor circuitry 1560 and/or the failure detector circuitry 1562 may form a portion of one or more of the reliability composition logic unit 1314, the memory 1316, the I/O subsystem 1320, and/or other components of the resource manager server 1202.

In the illustrative environment 1500, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network communicator 1520, respectively. To do so, the network communicator 1520 is configured to receive and process data packets from one system or computing device (e.g., the disaggregated resources, the compute sled 1204, the client device 1214) and to prepare and send data packets to a system or computing device (e.g., the disaggregated resources, the compute sled 1204, the client device 1214). Accordingly, in some embodiments, at least a portion of the functionality of the network communicator 1520 may be performed by the communication circuitry 1330, and, in the illustrative embodiment, by the NIC 1332.

The resource parameter determiner 1530, which may be embodied as hardware, firmware, software, virtualized hardware, emulated architecture, and/or a combination thereof as discussed above, is configured to receive resource data from each disaggregated resource (e.g., a data storage device 1220, a memory device 1230, and/or other resources 1240) and determine the reliability, availability, and/or resiliency of each disaggregated resource based on the resource data. In other words, the resource parameter determiner 1530 is configured to determine the likelihood that a disaggregated resource will perform its intended function for a specified interval (i.e., an execution time of an application or a workload) without any failure, how long the disaggregated resource is likely to be available to perform its intended function, and the ability of the resource to provide and maintain a predefined level of service in spite of any faults and/or other challenges to normal operation. The resource parameter determiner 1530 may further determine a corresponding power domain of each disaggregated resource. As discussed above, the system 1200 may include multiple power domains, where resources of each power domain are powered by the same power source. The resource parameter determiner 1530 may further determine telemetry data received from each disaggregated resource. For example, the telemetry data may include failure history data (e.g., transient and historical hardware failures and/or power failures) of the disaggregated resource. In some embodiments, the resource parameter determiner 1530 may further determine inherent reliability characteristics of each disaggregated resource (e.g., the storage device 1220, the memory device 1230, and/or other resource 1240) which may change from one technology to another or from one manufacturer to another. The resource parameter determiner 1530 is configured to store the resource data of each disaggregated resource in the resource database 1502. Additionally, the power domain, the telemetry data, and inherent reliability characteristics of each disaggregated resource may also be stored in the resource database 1502.

The requested node parameter determiner 1540, which may be embodied as hardware, firmware, software, virtualized hardware, emulated architecture, and/or a combination thereof as discussed above, is configured to determine node parameters of a node requested to be created by the compute sled 1204. The node parameters may be indicated by a user or an application running on the compute sled 1204. For example, the requested node parameters may include a level of reliability, a level of availability, a level of resiliency, a replication requirement, compute requirements, and/or memory and data storage requirements. In other words, a node request received from the compute sled 1204 indicates a target (e.g., a requested) likelihood that the disaggregated resources of the managed node will perform intended functions for a specified interval (i.e., an execution time of an application or a workload) without any failure, a target time period that the disaggregated resources of the managed node will be available to perform the intended functions, and target backup measures to safeguard against faults to maintain a target level of service. The requested node parameter determiner 1540 is configured to store the requested node parameters in the managed node parameter database 1504. As discussed below, the managed node parameter database 1504 may be used to monitor whether the managed node continues to satisfy the requested node parameters throughout the execution of the application.

The resource selector 1550, which may be embodied as hardware, firmware, software, virtualized hardware, emulated architecture, and/or a combination thereof as discussed above, is configured to select disaggregated resources to compose a node to satisfy the node parameters requested by the compute sled 1204. As discussed above, the requested node parameters may indicate a level of reliability, a level of availability, and/or a replication requirement. In addition to the requested node parameters, the resource selector 1550 may further consider failure data history included in the telemetry data received from each disaggregated resource to determine disaggregated resources to include in the managed node. Based on the requested node parameters and the telemetry data, the resource selector 1550 may select disaggregated resources to compose a node to satisfy the requested node parameters (i.e., the level of reliability and/or the level of availability). In some embodiments, the resource selector 1550 may store the parameters of the managed node in the managed node parameter database 1504.

Additionally, in response to a replication requirement, the resource selector 1550 may further determine a number of replicas needed to satisfy the node parameters requested by the compute sled 1204. Specifically, the resource selector 1550 may select resources and memory address ranges within the selected resources to replicate application data. As discussed in detail below, the resource manager server 1202 may configure the compute sled 1204 to replicate data written by the application on multiple resources at the specified memory address ranges to satisfy the requested node parameters (e.g., to achieve the level of reliability, availably, and/or resiliency) requested by the compute sled 1204. It should be appreciated that different memory address spaces within the same resource may have different levels of reliability, availably, and/or resiliency. For example, the compute sled 1204 may replicate writes to multiple disaggregated resources and/or implement load balancing schemes using the telemetry data as an input to distribute data access requests among the allocated resources.

The managed node monitor 1560, which may be embodied as hardware, firmware, software, virtualized hardware, emulated architecture, and/or a combination thereof as discussed above, is configured to monitor disaggregated resources of the managed node created in response to the node request from the compute sled 1204. The managed node monitor 1560 further includes the failure detector 1562, which may be embodied as hardware, firmware, software, virtualized hardware, emulated architecture, and/or a combination thereof as discussed above, and is configured to detect any failure of the managed node. For example, in some embodiments, the failure may be caused by a hardware failure of one or more of the disaggregated resources of the managed node. Additionally or alternatively, the failure may be caused by power failure of a power supply of a power domain connected to one or more of the disaggregated resources of the managed node. In some embodiments, the managed node monitor 1560 may track transient and historical failures associated with each disaggregated resource and store records of the failures in the failure history database 1506. It should be appreciated that the failure history data 1506 may be used to evaluate a static reliability factor (e.g., data indicative of an expected lifetime of resource, which may be stored in non-volatile memory of the device, such as by the manufacturer of the resource, and reported by the resource to the resource manager server 1202) the of each disaggregated resource.

Figure 16:
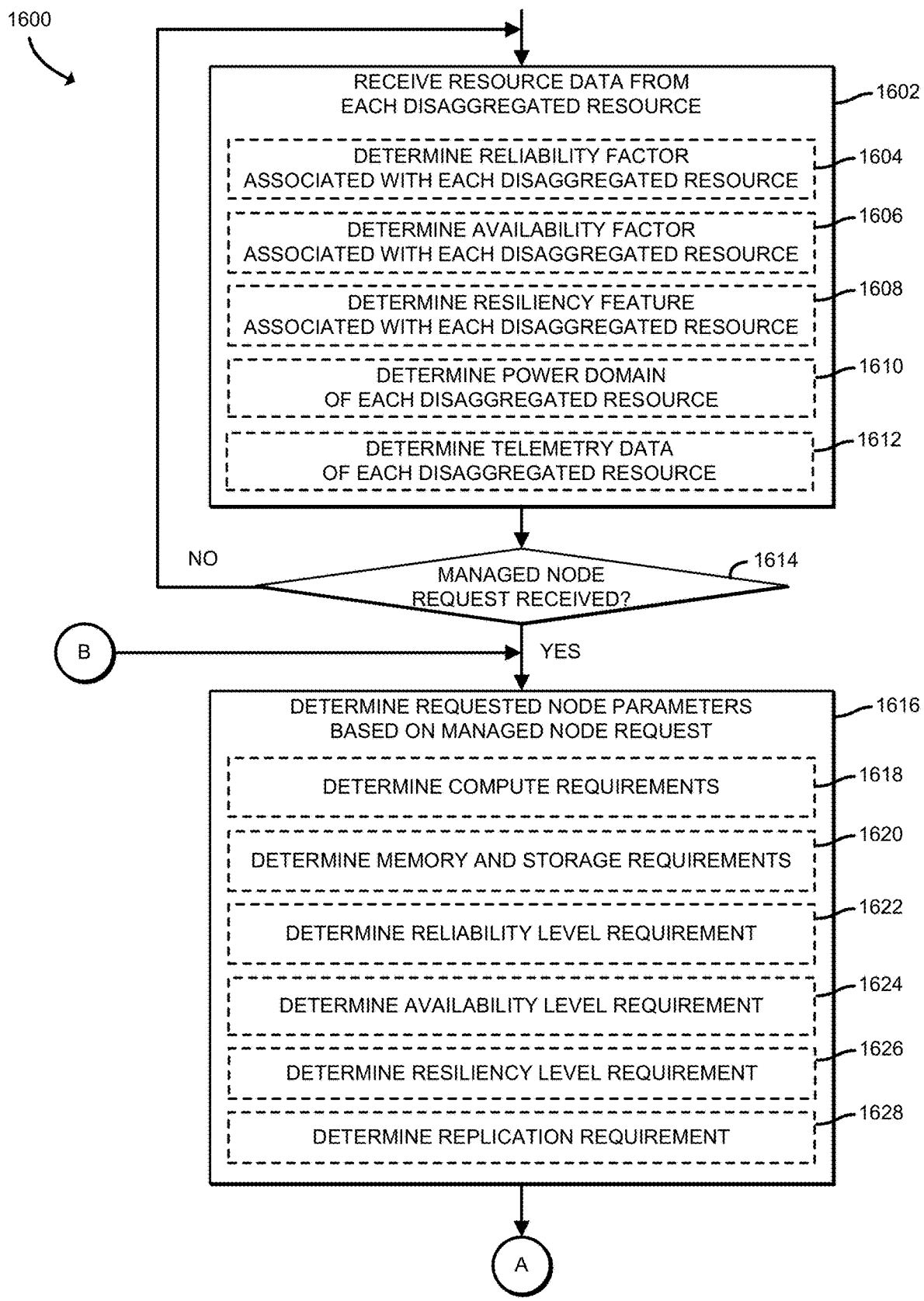
FIGS. 16 and 17 are a simplified flow diagram of at least one embodiment of a method for dynamically allocating disaggregated resources to a managed node as a function of resource data of the disaggregated resources that may be performed by the resource manager server of FIGS. 12, 13, and 15.
Figure 17:
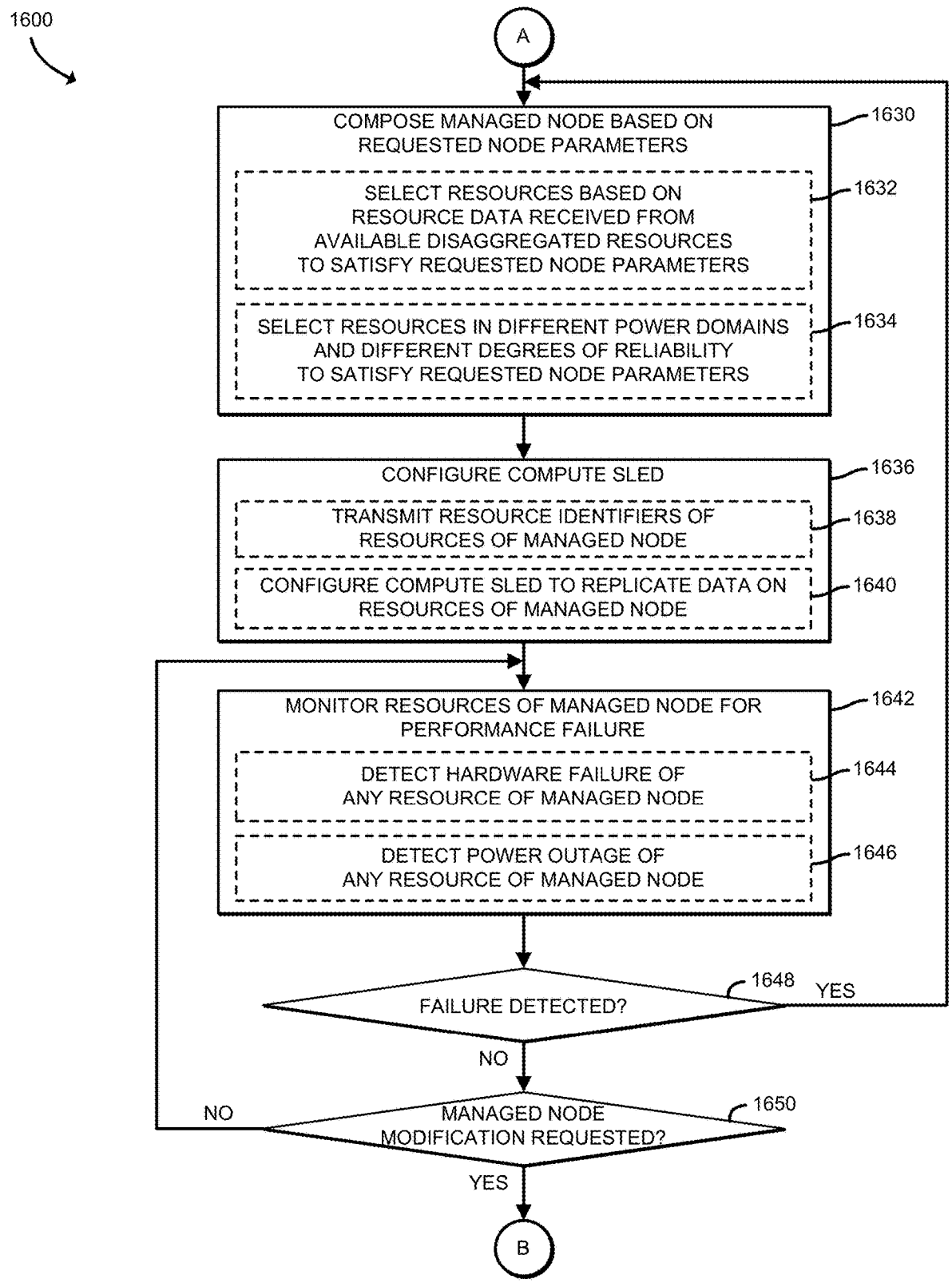

Referring now to FIGS. 16 and 17, in use, the resource manager server 1202 may execute a method 1600 for dynamically allocating disaggregated resources to a managed node as a function of resource data of the disaggregated resources. The method 1600 begins with block 1602 in which the resource manager server 1202 receives resource data from each disaggregated resource. In some embodiments, in block 1604, the resource manager server 1202 may determine reliability factor(s) associated with a corresponding resource based on the received resource data. As discussed above, the reliability factors may indicate the likelihood that the corresponding disaggregated resource will perform its intended function for a specified interval (i.e., an execution time of an application or a workload) without any failure. In some embodiments, the resource manager server 1202 may determine inherent reliability characteristics of each disaggregated resource (e.g., the storage device 1220, the memory device 1230, and/or other resource 1240) which may change from one technology to another or from one manufacturer to another.

Additionally or alternatively, in block 1606, the resource manager server 1202 may determine availability factor(s) associated with the corresponding resource based on the received resource data. The availability factors may indicate how long the corresponding disaggregated resource is likely to be available to perform its intended function. Additionally or alternatively, in block 1608, the resource manager server 1202 may determine resiliency feature(s) associated with the corresponding resource based on the received resource data. The resiliency features may indicate the ability of the corresponding resource to provide and maintain an acceptable level of service in the face of faults and challenges to normal operation. In some embodiments, in block 1610, the resource manager server 1202 may further determine a power domain associated with the corresponding disaggregated resource. As discussed above, the system 1200 may include multiple power domains, and resources of each power domain are powered by the same power source. In some embodiments, the resource manager server 1202 may further determine telemetry data received from each disaggregated resource in block 1612. For example, the telemetry data may include failure data history (e.g., transient and historical hardware failures and/or power failures) of the disaggregated resource.

Subsequently, in block 1614, the resource manager server 1202 determines whether a request to compose a managed node has been received from the compute sled 1204. If the resource manager server 1202 determines that a managed node request has not been received, the method 1600 loops back to block 1602 to continue receiving resource data from disaggregated resources. If, however, the resource manager server 1202 determines that a managed node request has been received, the method 1600 advances to block 1616. In the illustrative embodiment, the managed node request includes node parameters indicative of target characteristics of the managed node to be created (e.g., a particular compute capacity, a particular memory bandwidth, a particular data storage capacity, a level of reliability, resiliency, and/or or availability of the resources).

In block 1616, the resource manager server 1202 determines requested node parameters based on the received managed node request (e.g., by parsing the node parameters included in the request from the compute sled 1204). For example, in some embodiments, the resource manager server 1202 determines compute requirements (e.g., a number of floating point operations per second, a number of instructions executed per second, etc.) in block 1618 and memory and storage requirements (e.g., input/output operations per second, memory bandwidth, memory latency, data storage capacity, etc.) in block 1620. Additionally or alternatively, in block 1622, the resource manager server 1202 determines a level of reliability of a requested managed node. The requested level of reliability may indicate a target (e.g., a requested) likelihood that disaggregated resources of the managed node will perform their intended functions for a specified interval (i.e., an execution time of an application or a workload) without any failure. In the illustrative embodiment, in block 1624, the resource manager server 1202 determines a target (e.g., requested) level of availability of a requested managed node. The requested level of availability may indicate a target percentage of a time period that the disaggregated resources of the managed node are to be available to perform the intended functions. Additionally or alternatively, in block 1626, the resource manager server 1202 may determine, from the node parameters, a level of resiliency of a requested managed node. The requested level of resiliency may indicate a target ability (e.g., a recovery time) to provide and maintain an acceptable level of service (e.g., a maximum latency, a minimum throughput, etc.) in the face of faults and challenges to normal operation. The resource manager server 1202, in block 1628, may also determine, from the node request, a replication requirement indicative of whether replication of data written by the application is requested and how many replicas are to be made.

Subsequently, the method 1600 proceeds to block 1630 shown in FIG. 17. In block 1630, resource manager server 1202 creates a managed node based on the requested node parameters. To do so, in block 1632, the resource manager server 1202 may select disaggregated resources based on the resource data received from each of the disaggregated resources to satisfy the requested node parameters. Additionally, in some embodiments, the resource manager server 1202 may select disaggregated resources that are in different power domains and have different degrees of reliability to satisfy the requested node parameters in block 1634. It should be appreciated that creating a managed node with resources that are in different power domains may provide an additional reliability and/or resiliency feature that prevents a complete failure when one of the power domains fails.

In block 1636, the resource manager server 1202 configures the compute sled 1204. For example, in block 1638, the resource manager server 1202 may transmit, to the compute sled 1204, resource identifiers of the disaggregated resources that were selected to form the managed node that satisfies the requested node parameters. In some embodiments, the resource manager server 1202 may configure the compute sled 1204 to replicate data on two or more disaggregated resources of the managed node, as indicated in block 1640. To do so, the resource manager server 1202 may transmit the resource identifiers of the disaggregated resources and corresponding memory address ranges of those disaggregated resources at which the application data is to be replicated. It should be appreciated that the replication may provide additional reliability, availability, and/or resiliency feature to achieve the level of reliability, availably, and/or resiliency.

Subsequently, in block 1642, the resource manager server 1202 monitors the resources of the managed node for any performance failures. For example, in block 1644, the resource manager server 1202 may detect a hardware failure of one or more of the disaggregated resources of the managed node (e.g., from telemetry data reported by the corresponding resource). Additionally or alternatively, in block 1646, the resource manager server 1202 may detect a failure caused by a power outage of power supply of a power domain connected to one or more of the disaggregated resources of the managed node (e.g., due to a lack of telemetry data from any resources located in the power domain, from telemetry data reported by the power source associated with the power domain, etc.). In some embodiments, the resource manager server 1202 may further track and store transient and historical failures associated with each disaggregated resource. It should be appreciated that the failure history may be used to evaluate the static reliability factor of each disaggregated resource.

If the resource manager server 1202 detects a resource failure in block 1648, the method 1600 loops back to block 1630 to modify the managed node to satisfy the requested node parameters. In some embodiments, the resource manager server 1202 may reevaluate the reliability of the disaggregated resources of the managed node based on the reliability of the failed resource(s) prior to looping back to block 1630 to modify the managed node to satisfy the requested node parameters. If, however, a resource failure is not detected, the method 1600 advances to block 1650, in which the resource manager server 1202 determines whether a managed node modification is requested from the compute sled 1204. For example, in some embodiments, the compute sled 1204 may desire to modify the level of reliability, availability, and/or resiliency of the managed node during the execution of the application. In some embodiments, after the completion of the application, the compute sled 1204 may request the resource manager server 1202 to modify the managed node to satisfy a different set of node parameters to execute a new application.

If a managed node modification request has not been received, the method 1600 loops back to block 1642 to continue monitoring the disaggregated resources of the managed node for a performance failure. If, however, the resource manager server 1202 determines that a managed node modification request has been received, the method 1600 loops back to block 1616 to modify the managed node to satisfy new requested node parameters based on the managed node modification request.

Figure 18:
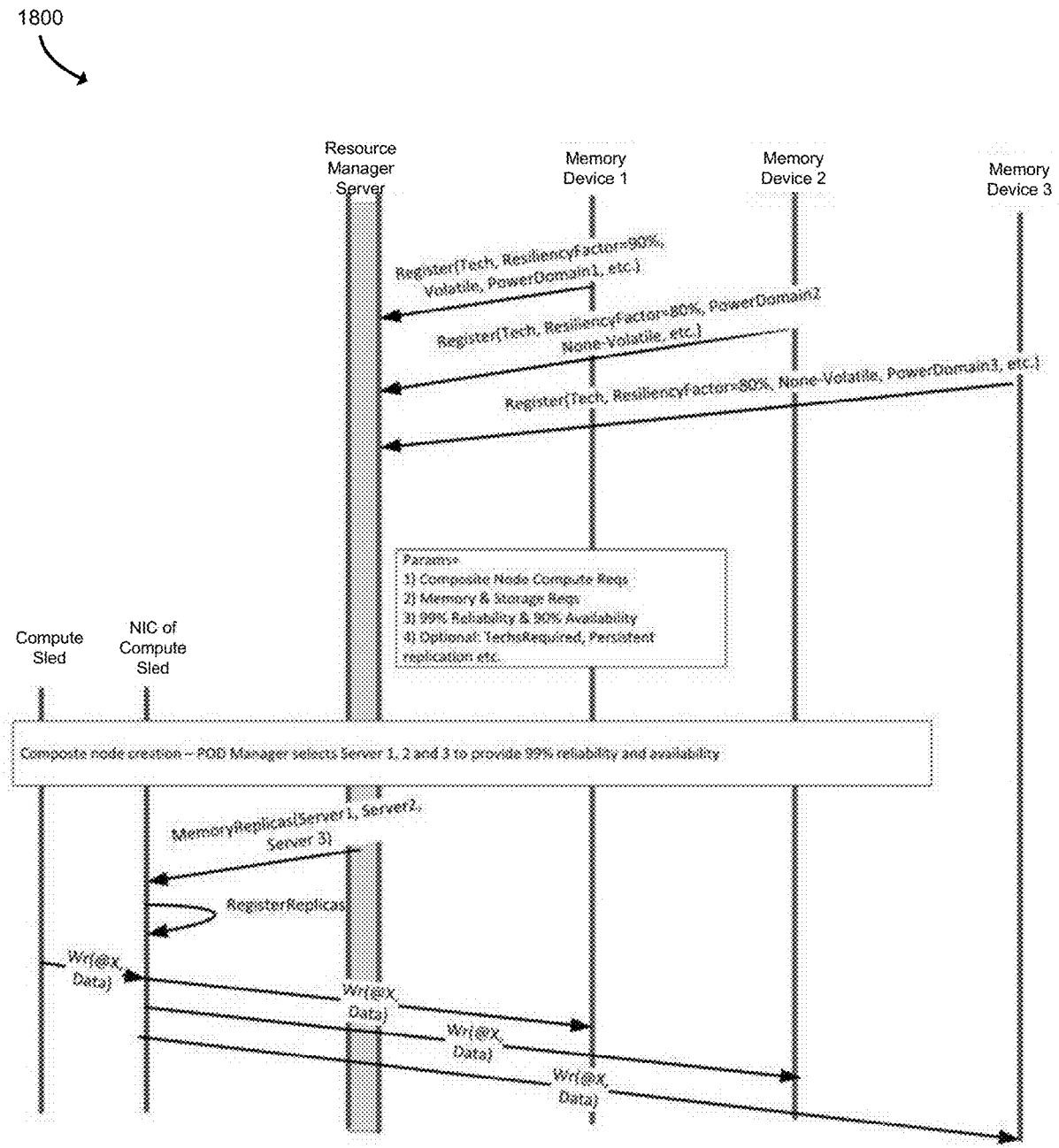
FIGS. 18 and 19 are simplified diagrams of at least one embodiment of data communications that may be sent through the system of FIG. 12 in association with providing automatic disaggregated resources reliability.
Figure 19:
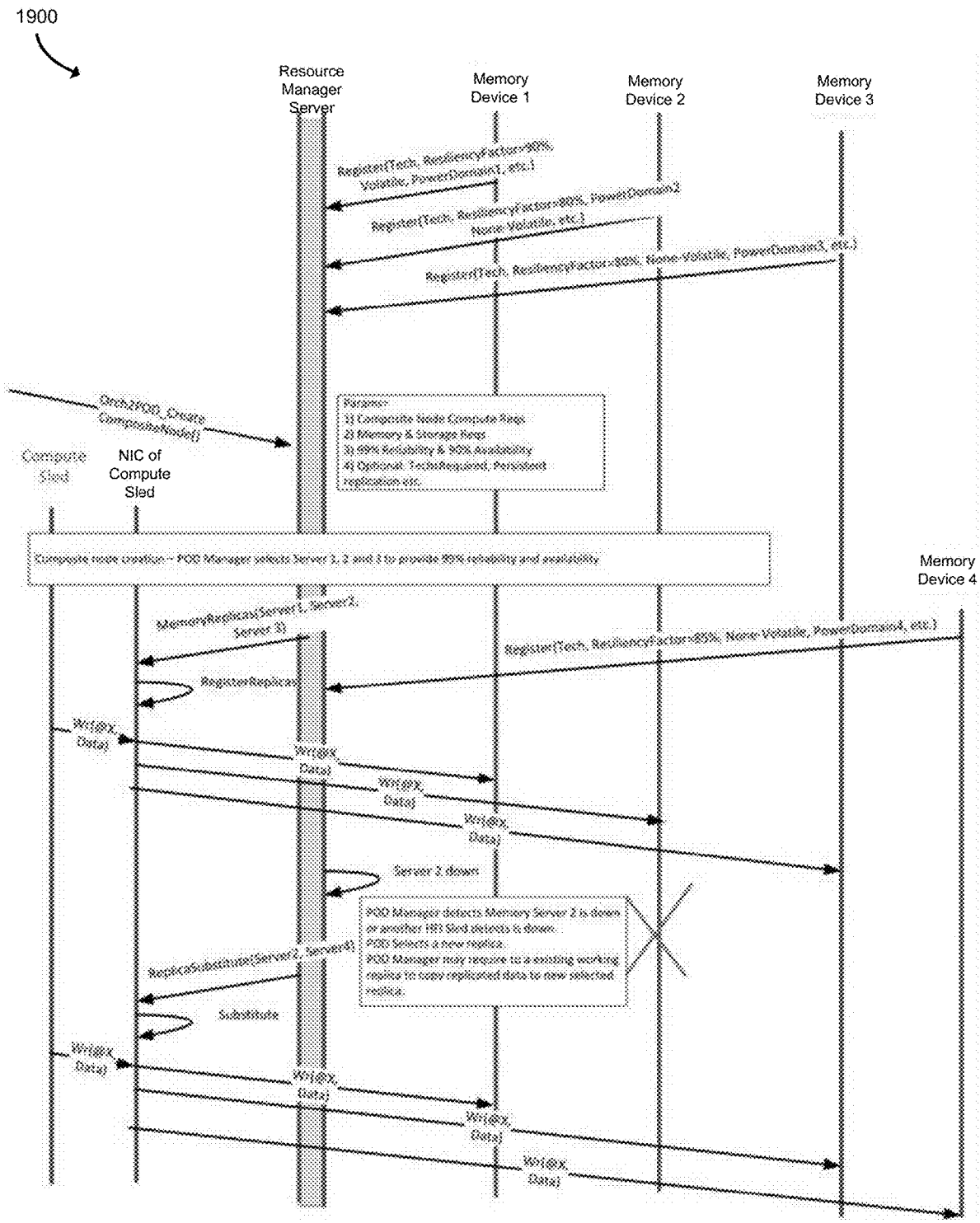

Referring now to FIGS. 18 and 19, diagrams 1800, 1900 illustrate exemplary processes of dynamically allocating disaggregated resources to a managed node as a function of resource data of the disaggregated resources. The illustrative diagrams 1800, 1900 include the resource manager server 1202, the memory devices 1230, and the compute sled 1204. It should be appreciated that a similar process may be applied with the storage devices 1220, instead of memory devices 1230. As illustrated in FIG. 18, the each memory device 1230 transmits resource data that may include any data indicative of the resource type, reliability, availability, and/or resiliency of each memory device 1230. For example, the resource data of the Memory Device 1 indicates that it has resiliency factor of 90%, includes volatile memory, and is connected to a Power Domain 1. Similarly, the resource data of the Memory Device 2 indicates that it has resiliency factor of 80%, includes non-volatile memory, and is connected to a Power Domain 2. Lastly, the resource data of the Memory Device 3 indicates that it has resiliency factor of 80%, includes non-volatile memory, and is connected to a Power Domain 3.

As discussed above, the resource manager server 1202 determines node parameters requested based on a node request from the compute sled 1204. For example, the node request indicates that 99% reliability, 90% availability, and replication are requested. As illustrated in FIG. 18, the resource manager server 1202 determines that Memory Devices 1, 2, and 3 satisfy the requested node parameters, creates a managed node that includes Memory Devices 1, 2, and 3, and transmits the memory device information (e.g., resource identifiers of each memory device) of Memory Devices 1, 2, and 3 to the compute sled 1204. The resource manager server 1202 further transmits, to the NIC 1434 (e.g., to the replication logic unit 1434) of the compute sled 1204, instructions with the memory address ranges of each memory device to use for replication. The compute sled 1204 then registers the replication instruction and writes application data to Memory Devices 1, 2, and 3 at the specified memory address ranges of each memory device.

Referring now to FIG. 19, diagram 1900 illustrates an exemplary process of dynamically allocating disaggregated resources to a managed node when a failure is detected. As illustrated in FIG. 19, the resource manager server 1202 receives resource data associated with a new Memory Device 4 that has been added to the system. As shown in FIG. 19, the resource data of the Memory Device 4 indicates that it has resiliency factor of 85%, includes non-volatile memory, and is connected to a Power Domain 4. It should be appreciated that the resource manager server 1202 may continually receive resource data of available disaggregated resources.

As illustrated in FIG. 19, subsequent to transmitting the write requests to Memory Devices 1, 2, and 3, the resource manager server 1202 learns that the write request to Memory Device 2 has failed due to the failure of Memory Device 2. The resource manager server 1202 is configured to determine whether there is another disaggregated resource that can replace Memory Device 2. Since Memory Device 4 has higher resiliency factor than the resiliency factor of Memory Device 2, the resource manager server 1202 determines that replacing Memory Device 2 with Memory Device 4 in the managed node will satisfy the node parameters requested by the compute sled 1204. As such, the resource manager server 1202 modifies the managed node to substitute Memory Device 2 with Memory Device 4, sends a notification of the substitution to the NIC 1434 (e.g., the replication logic unit 1436) of the compute sled 1204, and the compute sled 1204 subsequently transmits write requests to the Memory Devices 1, 3, and 4 at the specified memory address ranges of each memory device.

EXAMPLES

Illustrative examples of the technologies disclosed herein are provided below. An embodiment of the technologies may include any one or more, and any combination of, the examples described below.

Example 1 includes a resource manager server comprising a communication circuit to (i) receive resource data from a set of disaggregated resources, wherein the resource data is indicative of reliability of each disaggregated resource of the set of disaggregated resources and (ii) a receive a node request to compose a managed node; and a compute engine to determine, from the node request, node parameters indicative of a target reliability of one or more disaggregated resources of the set of disaggregated resources to be included in the managed node; compose, from the set of disaggregated resources, a managed node that satisfies the node parameters by configuring the compute sled to utilize the disaggregated resources of the managed node for the execution of a workload; and monitor the disaggregated resources of the managed node for a failure.

Example 2 includes the subject matter of Example 1, and wherein to receive the resource data comprises to receive resource data that is further indicative of an availability and/or a resiliency of a corresponding disaggregated resource.

Example 3 includes the subject matter of any of Examples 1 and 2, and wherein to receive the resource data comprises to determine resource parameters of each disaggregated resource based on the resource data.

Example 4 includes the subject matter of any of Examples 1-3, and wherein to determine the resource parameters comprises to determine a likelihood that each disaggregated resource will operate without a failure for a predefined time period.

Example 5 includes the subject matter of any of Examples 1-4, and wherein to determine the resource parameters comprises to determine a time period in which a disaggregated resource is likely to be available for utilization by the compute sled.

Example 6 includes the subject matter of any of Examples 1-5, and wherein to determine the resource parameters comprises to determine an ability of a disaggregated resource to recover from a fault.

Example 7 includes the subject matter of any of Examples 1-6, and wherein to receive the resource data comprises to receive data indicative of failure history of a corresponding disaggregated resource.

Example 8 includes the subject matter of any of Examples 1-7, and wherein to determine the node parameters comprises to determine node parameters that are additionally indicative of at least one of a target level of availability, a target level of resiliency, a replication requirement, a compute requirement, memory requirement, or a storage requirement.

Example 9 includes the subject matter of any of Examples 1-8, and wherein to determine the node parameters comprises to determine a target likelihood that each disaggregated resource of the managed node will execute the workload without a failure for a predefined time period.

Example 10 includes the subject matter of any of Examples 1-9, and wherein to determine the node parameters comprises to determine a target time period that each disaggregated resource of the managed node will be available to execute the workload.

Example 11 includes the subject matter of any of Examples 1-10, and wherein to determine the node parameters comprises to determine a target ability to recover from a fault of one or more disaggregated resources of the managed node.

Example 12 includes the subject matter of any of Examples 1-11, and wherein to determine the node parameters comprises to determine whether replication is requested.

Example 13 includes the subject matter of any of Examples 1-12, and wherein to compose the managed node comprises to select a sub-set of disaggregated resources from the set of disaggregated resources based on the resource data to satisfy the node parameters.

Example 14 includes the subject matter of any of Examples 1-13, and wherein to compose the managed node comprises to select a sub-set of disaggregated resources from the set of disaggregated resources that are in different power domains.

Example 15 includes the subject matter of any of Examples 1-14, and wherein to compose the managed node comprises to select a sub-set of disaggregated resources from the set of disaggregated resources that have different degrees of reliability.

Example 16 includes the subject matter of any of Examples 1-15, and wherein to compose the managed node comprises to transmit resource identifiers of the selected disaggregated resources of the managed node to the compute sled.

Example 17 includes the subject matter of any of Examples 1-16, and wherein to compose the managed node by configuring the compute sled comprises to transmit, via the communication circuit, resource identifiers of the selected disaggregated resources of the managed node and memory address ranges of the selected disaggregated resources at which application data is to be replicated.

Example 18 includes the subject matter of any of Examples 1-17, and wherein to monitor the disaggregated resources of the managed node for the failure comprises to detect a hardware failure of one or more disaggregated resources of the managed node.

Example 19 includes the subject matter of any of Examples 1-18, and wherein to monitor disaggregated resources of the managed node for the failure comprises to detect a power outage of a power supply of a power domain connected to one or more disaggregated resources of the managed node.

Example 20 includes the subject matter of any of Examples 1-19, and wherein the compute engine is further to modify, in response to a detection of a failure of one or more of disaggregated resources, the managed node.

Example 21 includes the subject matter of any of Examples 1-20, and wherein to modify the managed node comprises to reevaluate the reliability of the disaggregated resources of the managed node, determine if the managed node satisfies the node parameters, and recompose, in response to a determination that the managed node fails to satisfy the node parameters, a managed node that satisfy the node parameters.

Example 22 includes a method comprising receiving, by a resource manager server, resource data from a set of disaggregated resources, wherein the resource data is indicative of a reliability of each disaggregated resource; receiving, by the resource manager server, a node request to compose a managed node; determining, from the node request and by the resource manager server, node parameters indicative of a target reliability of one or more disaggregated resources of the set of disaggregated resources to be included in the managed node; composing, from the set of disaggregated resources and by the resource manager server, a managed node that satisfies the node parameters by configuring the compute sled to utilize the disaggregated resources of the managed node for the execution of a workload; and monitoring, by the resource manager server, the disaggregated resources of the managed node for a failure.

Example 23 includes the subject matter of Example 22, and wherein receiving the resource data comprises receiving, by the resource manager server, resource data that is further indicative of an availability and/or a resiliency of a corresponding disaggregated resource.

Example 24 includes the subject matter of any of Examples 22 and 23, and wherein receiving the resource data comprises determining, by the resource manager server, resource parameters of each disaggregated resource based on the resource data.

Example 25 includes the subject matter of any of Examples 22-24, and wherein determining the resource parameters comprises determining, by the resource manager server, a likelihood that each disaggregated resource will operate without a failure for a predefined time period.

Example 26 includes the subject matter of any of Examples 22-25, and wherein determining the resource parameters comprises determining, by the resource manager server, a time period in which a disaggregated resource is likely to be available for utilization by the compute sled.

Example 27 includes the subject matter of any of Examples 22-26, and wherein determining the resource parameters comprises determining, by the resource manager server, an ability of a disaggregated resource to recover from a fault.

Example 28 includes the subject matter of any of Examples 22-27, and wherein receiving the resource data comprises receiving, by the resource manager server, data indicative of failure history of a corresponding disaggregated resource.

Example 29 includes the subject matter of any of Examples 22-28, and wherein determining the node parameters comprises determining, by the resource manager server, node parameters that are additionally indicative of at least one of a target level of availability, a target level of resiliency, a replication requirement, a compute requirement, memory requirement, or a storage requirement.

Example 30 includes the subject matter of any of Examples 22-29, and wherein determining the node parameters comprises determining, by the resource manager server, a target likelihood that each disaggregated resource of the managed node will execute the workload without a failure for a predefined time period.

Example 31 includes the subject matter of any of Examples 22-30, and wherein determining the node parameters comprises determining, by the resource manager server, a target time period that each disaggregated resource of the managed node will be available to execute the workload.

Example 32 includes the subject matter of any of Examples 22-31, and wherein determining the node parameters comprises determining, by the resource manager server, a target ability to recover from a fault of one or more disaggregated resources of the managed node.

Example 33 includes the subject matter of any of Examples 22-32, and wherein determining the node parameters comprises determining, by the resource manager server, whether replication is requested.

Example 34 includes the subject matter of any of Examples 22-33, and wherein composing the managed node comprises selecting, by the resource manager server, a sub-set of disaggregated resources from the set of disaggregated resources based on the resource data to satisfy the node parameters.

Example 35 includes the subject matter of any of Examples 22-34, and wherein composing the managed node comprises selecting, by the resource manager server, a sub-set of disaggregated resources from the set of disaggregated resources that are in different power domains.

Example 36 includes the subject matter of any of Examples 22-35, and wherein composing the managed node comprises selecting, by the resource manager server, a sub-set of disaggregated resources from the set of disaggregated resources that have different degrees of reliability.

Example 37 includes the subject matter of any of Examples 22-36, and wherein composing the managed node comprises transmitting, by the resource manager server, resource identifiers of the selected disaggregated resources of the managed node to the compute sled.

Example 38 includes the subject matter of any of Examples 22-37, and wherein composing the managed node by configuring the compute sled comprises transmitting, by the resource manager server, resource identifiers of the selected disaggregated resources of the managed node and memory address ranges of the selected disaggregated resources at which application data is to be replicated.

Example 39 includes the subject matter of any of Examples 22-38, and wherein monitoring the disaggregated resources of the managed node for the failure comprises detecting, by the resource manager server, a hardware failure of one or more disaggregated resources of the managed node.

Example 40 includes the subject matter of any of Examples 22-39, and wherein monitoring disaggregated resources of the managed node for the failure comprises detecting, by the resource manager server, a power outage of a power supply of a power domain connected to one or more disaggregated resources of the managed node.

Example 41 includes the subject matter of any of Examples 22-40, and further including modifying, by the resource manager server and in response to a detection of a failure of one or more of disaggregated resources, the managed node.

Example 42 includes the subject matter of any of Examples 22-41, and wherein modifying the managed node comprises reevaluating the reliability of the disaggregated resources of the managed node, determining if the managed node satisfies the node parameters, and recomposing, in response to a determination that the managed node fails to satisfy the node parameters, a managed node that satisfy the node parameters.

Example 43 includes a resource manager server comprising one or more processors; one or more memory devices having stored therein a plurality of instructions that, when executed by the one or more processors, cause the compute device to perform the method of any of Examples 22-42.

Example 44 includes one or more machine-readable storage media comprising a plurality of instructions stored thereon that, in response to being executed, cause a resource manager server to perform the method of any of Examples 22-42.

Example 45 includes a resource manager server comprising means for performing the method of any of Examples 22-42.

Example 46 includes a resource manager server comprising a communication circuitry to (i) receive resource data from a set of disaggregated resources, wherein the resource data is indicative of reliability of each disaggregated resource of the set of disaggregated resources and (ii) a receive a node request to compose a managed node; and a reliability composition logic circuitry to determine, from the node request, node parameters indicative of a target reliability of one or more disaggregated resources of the set of disaggregated resources to be included in the managed node; compose, from the set of disaggregated resources, a managed node that satisfies the node parameters by configuring the compute sled to utilize the disaggregated resources of the managed node for the execution of a workload; and monitor the disaggregated resources of the managed node for a failure.

Example 47 includes the subject matter of Example 46, and wherein to receive the resource data comprises to receive resource data that is further indicative of an availability and/or a resiliency of a corresponding disaggregated resource.

Example 48 includes the subject matter of any of Examples 46 and 47, and wherein to receive the resource data comprises to determine resource parameters of each disaggregated resource based on the resource data.

Example 49 includes the subject matter of any of Examples 46-48, and wherein to determine the resource parameters comprises to determine a likelihood that each disaggregated resource will operate without a failure for a predefined time period.

Example 50 includes the subject matter of any of Examples 46-49, and wherein to determine the resource parameters comprises to determine a time period in which a disaggregated resource is likely to be available for utilization by the compute sled.

Example 51 includes the subject matter of any of Examples 46-50, and wherein to determine the resource parameters comprises to determine an ability of a disaggregated resource to recover from a fault.

Example 52 includes the subject matter of any of Examples 46-51, and wherein to receive the resource data comprises to receive data indicative of failure history of a corresponding disaggregated resource.

Example 53 includes the subject matter of any of Examples 46-52, and wherein to determine the node parameters comprises to determine node parameters that are additionally indicative of at least one of a target level of availability, a target level of resiliency, a replication requirement, a compute requirement, memory requirement, or a storage requirement.

Example 54 includes the subject matter of any of Examples 46-53, and wherein to determine the node parameters comprises to determine a target likelihood that each disaggregated resource of the managed node will execute the workload without a failure for a predefined time period.

Example 55 includes the subject matter of any of Examples 46-54, and wherein to determine the node parameters comprises to determine a target time period that each disaggregated resource of the managed node will be available to execute the workload.

Example 56 includes the subject matter of any of Examples 46-55, and wherein to determine the node parameters comprises to determine a target ability to recover from a fault of one or more disaggregated resources of the managed node.

Example 57 includes the subject matter of any of Examples 46-56, and wherein to determine the node parameters comprises to determine whether replication is requested.

Example 58 includes the subject matter of any of Examples 46-57, and wherein to compose the managed node comprises to select a sub-set of disaggregated resources from the set of disaggregated resources based on the resource data to satisfy the node parameters.

Example 59 includes the subject matter of any of Examples 46-58, and wherein to compose the managed node comprises to select a sub-set of disaggregated resources from the set of disaggregated resources that are in different power domains.

Example 60 includes the subject matter of any of Examples 46-59, and wherein to compose the managed node comprises to select a sub-set of disaggregated resources from the set of disaggregated resources that have different degrees of reliability.

Example 61 includes the subject matter of any of Examples 46-60, and wherein to compose the managed node comprises to transmit resource identifiers of the selected disaggregated resources of the managed node to the compute sled.

Example 62 includes the subject matter of any of Examples 46-61, and wherein to compose the managed node by configuring the compute sled comprises to transmit, via the communication circuitry, resource identifiers of the selected disaggregated resources of the managed node and memory address ranges of the selected disaggregated resources at which application data is to be replicated.

Example 63 includes the subject matter of any of Examples 46-62, and wherein to monitor the disaggregated resources of the managed node for the failure comprises to detect a hardware failure of one or more disaggregated resources of the managed node.

Example 64 includes the subject matter of any of Examples 46-63, and wherein to monitor disaggregated resources of the managed node for the failure comprises to detect a power outage of a power supply of a power domain connected to one or more disaggregated resources of the managed node.

Example 65 includes the subject matter of any of Examples 46-64, and wherein the reliability composition logic circuitry is further to modify, in response to a detection of a failure of one or more of disaggregated resources, the managed node.

Example 66 includes the subject matter of any of Examples 46-65, and wherein to modify the managed node comprises to reevaluate the reliability of the disaggregated resources of the managed node, determine if the managed node satisfies the node parameters, and recompose, in response to a determination that the managed node fails to satisfy the node parameters, a managed node that satisfy the node parameters.

Example 67 includes a resource manager server comprising circuitry for receiving resource data from a set of disaggregated resources, wherein the resource data is indicative of a reliability of each disaggregated resource; circuitry for receiving a node request to compose a managed node; means for determining, from the node request, node parameters indicative of a target reliability of one or more disaggregated resources of the set of disaggregated resources to be included in the managed node; means for composing, from the set of disaggregated resources, a managed node that satisfies the node parameters by configuring the compute sled to utilize the disaggregated resources of the managed node for the execution of a workload; and circuitry for monitoring the disaggregated resources of the managed node for a failure.

Example 68 includes the subject matter of Example 67, and wherein the circuitry for receiving the resource data comprises circuitry for receiving resource data that is further indicative of an availability and/or a resiliency of a corresponding disaggregated resource.

Example 69 includes the subject matter of any of Examples 67 and 68, and wherein the circuitry for receiving the resource data comprises circuitry for determining resource parameters of each disaggregated resource based on the resource data.

Example 70 includes the subject matter of any of Examples 67-69, and wherein the means for determining the resource parameters comprises means for determining a likelihood that each disaggregated resource will operate without a failure for a predefined time period.

Example 71 includes the subject matter of any of Examples 67-70, and wherein the means for determining the resource parameters comprises means for determining a time period in which a disaggregated resource is likely to be available for utilization by the compute sled.

Example 72 includes the subject matter of any of Examples 67-71, and wherein the means for determining the resource parameters comprises means for determining an ability of a disaggregated resource to recover from a fault.

Example 73 includes the subject matter of any of Examples 67-72, and wherein the circuitry for receiving the resource data comprises circuitry for receiving data indicative of failure history of a corresponding disaggregated resource.

Example 74 includes the subject matter of any of Examples 67-73, and wherein the means for determining the node parameters comprises means for determining node parameters that are additionally indicative of at least one of a target level of availability, a target level of resiliency, a replication requirement, a compute requirement, memory requirement, or a storage requirement.

Example 75 includes the subject matter of any of Examples 67-74, and wherein the means for determining the node parameters comprises means for determining a target likelihood that each disaggregated resource of the managed node will execute the workload without a failure for a predefined time period.

Example 76 includes the subject matter of any of Examples 67-75, and wherein the means for determining the node parameters comprises means for determining a target time period that each disaggregated resource of the managed node will be available to execute the workload.

Example 77 includes the subject matter of any of Examples 67-76, and wherein the means for determining the node parameters comprises means for determining a target ability to recover from a fault of one or more disaggregated resources of the managed node.

Example 78 includes the subject matter of any of Examples 67-77, and wherein the means for determining the node parameters comprises circuitry for determining whether replication is requested.

Example 79 includes the subject matter of any of Examples 67-78, and wherein the means for composing the managed node comprises means for selecting a sub-set of disaggregated resources from the set of disaggregated resources based on the resource data to satisfy the node parameters.

Example 80 includes the subject matter of any of Examples 67-79, and wherein the means for composing the managed node comprises means for selecting a sub-set of disaggregated resources from the set of disaggregated resources that are in different power domains.

Example 81 includes the subject matter of any of Examples 67-80, and wherein the means for composing the managed node comprises means for selecting a sub-set of disaggregated resources from the set of disaggregated resources that have different degrees of reliability.

Example 82 includes the subject matter of any of Examples 67-81, and wherein the means for composing the managed node comprises means for transmitting resource identifiers of the selected disaggregated resources of the managed node to the compute sled.

Example 83 includes the subject matter of any of Examples 67-82, and wherein the means for composing the managed node by configuring the compute sled comprises means for transmitting resource identifiers of the selected disaggregated resources of the managed node and memory address ranges of the selected disaggregated resources at which application data is to be replicated.

Example 84 includes the subject matter of any of Examples 67-83, and wherein the circuitry for monitoring the disaggregated resources of the managed node for the failure comprises circuitry for detecting a hardware failure of one or more disaggregated resources of the managed node.

Example 85 includes the subject matter of any of Examples 67-84, and wherein the circuitry for monitoring disaggregated resources of the managed node for the failure comprises circuitry for detecting a power outage of a power supply of a power domain connected to one or more disaggregated resources of the managed node.

Example 86 includes the subject matter of any of Examples 67-85, and further including means for modifying, in response to a detection of a failure of one or more of disaggregated resources, the managed node.

Example 87 includes the subject matter of any of Examples 67-86, and wherein means for modifying the managed node comprises means for reevaluating the reliability of the disaggregated resources of the managed node, determining if the managed node satisfies the node parameters, and recomposing, in response to a determination that the managed node fails to satisfy the node parameters, a managed node that satisfy the node parameters.

The invention claimed is:

1. A resource manager server comprising:
   a communication circuit to (i) receive resource data from a set of disaggregated resources, wherein the resource data is indicative of reliability of each disaggregated resource of the set of disaggregated resources and (ii) receive a node request to compose a managed node; and
   a compute engine to:
   determine, from the node request, node parameters indicative of a target reliability of one or more disaggregated resources of the set of disaggregated resources to be included in the managed node;
   compose, from the set of disaggregated resources, a managed node that satisfies the node parameters by configuring a compute sled to utilize the disaggregated resources of the managed node for the execution of a workload, including selecting a sub-set of disaggregated resources from the set of disaggregated resources that are in different power domains; and
   monitor the disaggregated resources of the managed node for a failure.

2. The resource manager server of claim 1, wherein to receive the resource data comprises to receive resource data that is further indicative of an availability and/or a resiliency of a corresponding disaggregated resource.

3. The resource manager server of claim 1, wherein to receive the resource data comprises to determine resource parameters of each disaggregated resource based on the resource data.

4. The resource manager server of claim 3, wherein to determine the resource parameters comprises to determine a likelihood that each disaggregated resource will operate without a failure for a predefined time period, a time period in which a disaggregated resource is likely to be available for utilization by the compute sled, and/or an ability of a disaggregated resource to recover from a fault.

5. The resource manager server of claim 1, wherein to receive the resource data comprises to receive data indicative of failure history of a corresponding disaggregated resource.

6. The resource manager server of claim 1, wherein to determine the node parameters comprises to determine node parameters that are additionally indicative of at least one of a target level of availability, a target level of resiliency, a replication requirement, a compute requirement, memory requirement, or a storage requirement.

7. The resource manager server of claim 1, wherein to compose the managed node comprises to select a sub-set of disaggregated resources from the set of disaggregated resources that have different degrees of reliability.

8. The resource manager server of claim 1, wherein to compose the managed node comprises to select a sub-set of disaggregated resources from the set of disaggregated resources based on the resource data to satisfy the node parameters.

9. The resource manager server of claim 8, wherein to compose the managed node comprises to transmit resource identifiers of the selected disaggregated resources of the managed node to the compute sled.

10. The resource manager server of claim 8, wherein to compose the managed node by configuring the compute sled comprises to transmit, via the communication circuit, resource identifiers of the selected disaggregated resources of the managed node and memory address ranges of the selected disaggregated resources at which application data is to be replicated.

11. The resource manager server of claim 1, wherein the compute engine is further to modify, in response to a detection of a failure of one or more of disaggregated resources, the managed node.

12. The resource manager service of claim 11, wherein to modify the managed node comprises to reevaluate the reliability of the disaggregated resources of the managed node, determine if the managed node satisfies the node parameters, and recompose, in response to a determination that the managed node fails to satisfy the node parameters, a managed node that satisfy the node parameters.

13. One or more non-transitory machine-readable storage media comprising a plurality of instructions stored thereon that, in response to being executed, cause a resource manager server to:
   receive resource data from a set of disaggregated resources, wherein the resource data is indicative of reliability of each disaggregated resource of the set of disaggregated resources,
   receive a node request to compose a managed node;
      determine, from the node request, node parameters indicative of a target reliability of one or more disaggregated resources of the set of disaggregated resources to be included in the managed node;
      compose, from the set of disaggregated resources, a managed node that satisfies the node parameters by configuring a compute sled to utilize the disaggregated resources of the managed node for the execution of a workload, including selecting a sub-set of disaggregated resources from the set of disaggregated resources that are in different power domains; and
      monitor the disaggregated resources of the managed node for a failure.

14. The one or more non-transitory machine-readable storage media of claim 13, wherein to receive the resource data comprises to receive resource data that is further indicative of an availability and/or a resiliency of a corresponding disaggregated resource.

15. The one or more non-transitory machine-readable storage media of claim 13, wherein to receive the resource data comprises to determine resource parameters of each disaggregated resource based on the resource data.

16. The one or more non-transitory machine-readable storage media of claim 15, wherein to determine the resource parameters comprises to determine a likelihood that each disaggregated resource will operate without a failure for a predefined time period, a time period in which a disaggregated resource is likely to be available for utilization by the compute sled, and/or an ability of a disaggregated resource to recover from a fault.

17. The one or more non-transitory machine-readable storage media of claim 13, wherein to receive the resource data comprises to receive data indicative of failure history of a corresponding disaggregated resource.

18. The one or more non-transitory machine-readable storage media of claim 13, wherein to determine the node parameters comprises to determine node parameters that are additionally indicative of at least one of a target level of availability, a target level of resiliency, a replication requirement, a compute requirement, memory requirement, or a storage requirement.

19. The one or more non-transitory machine-readable storage media of claim 13, wherein to compose the managed node comprises to select a sub-set of disaggregated resources from the set of disaggregated resources that have different degrees of reliability.

20. The one or more non-transitory machine-readable storage media of claim 13, wherein to compose the managed node comprises to select a sub-set of disaggregated resources from the set of disaggregated resources based on the resource data to satisfy the node parameters.

21. The one or more non-transitory machine-readable storage media of claim 20, wherein to compose the managed node comprises to transmit resource identifiers of the selected disaggregated resources of the managed node of the compute sled.

22. The one or more non-transitory machine-readable storage media of claim 20, wherein to compose the managed node by configuring the compute sled comprises to transmit, via a communication circuit, resource identifiers of the selected disaggregated resources of the managed node and memory address ranges of the selected disaggregated resources at which application data is to be replicated.

23. The one or more non-transitory machine-readable storage media of claim 13, wherein the plurality of instructions, when executed, further cause the resource manager server to modify, in response to a detection of a failure of one or more of disaggregated resources, the managed node.

24. The one or more non-transitory machine-readable storage media of claim 23, wherein to modify the managed node comprises to reevaluate the reliability of the disaggregated resources of the managed node, determine if the managed node satisfies the node parameters, and recompose, in response to a determination that the managed node fails to satisfy the node parameters, a managed node that satisfy the node parameters.

25. A resource manager server comprising:
   circuitry for receiving resource data from a set of disaggregated resources, wherein the resource data is indicative of a reliability of each disaggregated resource;
   circuitry for receiving a node request to compose a managed node;
   means for determining, from the node request, node parameters indicative of a target reliability of one or more disaggregated resources of the set of disaggregated resources to be included in the managed node;
   means for composing, from the set of disaggregated resources, a managed node that satisfies the node parameters, including selecting a sub-set of disaggregated resources from the set of disaggregated resources that are in different power domains;
   means for configuring a compute sled to utilize the disaggregated resources of the managed node for the execution of a workload; and
   circuitry for monitoring the disaggregated resources of the managed node for a failure.

26. A method comprising:
   receiving, by a resource manager server, resource data from a set of disaggregated resources, wherein the resource data is indicative of a reliability of each disaggregated resource;
   receiving, by the resource manager server, a node request to compose a managed node;
   determining, from the node request and by the resource manager server, node parameters indicative of a target reliability of one or more disaggregated resources of the set of disaggregated resources to be included in the managed node;
   composing, from the set of disaggregated resources and by the resource manager server, a managed node that satisfies the node parameters, including selecting a sub-set of disaggregated resources from the set of disaggregated resources that are in different power domains;

configuring, by the resource manager server, a compute sled to utilize the disaggregated resources of the managed node for the execution of a workload; and monitoring, by the resource manager server, the disaggregated resources of the managed node for a failure.

27. The method of claim 26, wherein receiving the resource data comprises determining, by the resource manager server, resource parameters of each disaggregated resource based on the resource data, wherein determining the resource parameters comprises determining, by the resource manager server, a likelihood that each disaggregated resource will operate without a failure for a predefined time period, a time period in which a disaggregated resource is likely to be available for utilization by the compute sled, and/or an ability of a disaggregated resource to recover from a fault.

28. The method of claim 26, wherein determining the node parameters comprises determining, by the resource manager server, node parameters that are additionally indicative of at least one of a target level of availability, a target level of resiliency, a replication requirement, a compute requirement, memory requirement, or a storage requirement.

* * * * *